US011804982B2

(12) United States Patent
Ye et al.

(10) Patent No.: US 11,804,982 B2
(45) Date of Patent: Oct. 31, 2023

(54) COMMUNICATION METHOD AND APPARATUS

(71) Applicant: HUAWEI TECHNOLOGIES CO., LTD., Shenzhen (CN)

(72) Inventors: Qing Ye, Dongguan (CN); Jian Ye, Dongguan (CN); Zhiguo Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 163 days.

(21) Appl. No.: 17/343,192

(22) Filed: Jun. 9, 2021

(65) Prior Publication Data
US 2021/0297285 A1 Sep. 23, 2021

Related U.S. Application Data

(63) Continuation of application No. PCT/CN2019/121841, filed on Nov. 29, 2019.

(30) Foreign Application Priority Data

Dec. 10, 2018 (CN) .......................... 201811505586.1

(51) Int. Cl.
*H04L 12/437* (2006.01)
*H04L 41/0654* (2022.01)
(52) U.S. Cl.
CPC ........ *H04L 12/437* (2013.01); *H04L 41/0654* (2013.01)
(58) Field of Classification Search
None
See application file for complete search history.

(56) References Cited

U.S. PATENT DOCUMENTS 9,819,536 B2 * 11/2017 Tsubota ................ H04L 12/437
2008/0316918 A1 12/2008 Sakauchi
(Continued)

FOREIGN PATENT DOCUMENTS

CN 102546425 A 7/2012
CN 107395425 A 11/2017
(Continued)

OTHER PUBLICATIONS

IA OIF-FLEXE-02.0, Jun. 22, 2018, total 51 pages.
(Continued)

*Primary Examiner* — Chi Ho A Lee
(74) *Attorney, Agent, or Firm* — Rimon PC

(57) ABSTRACT

This application provides a method for transmitting data on a ring network. The ring network includes two adjacent FlexE cross-connection rings, each FlexE cross-connection ring includes at least three nodes, the two FlexE cross-connection rings have at least one common node, the common node carries a cross-ring end-to-end working path, and each of the two FlexE cross-connection rings includes one ring-shaped protection path. Because there is a protection path between any two adjacent nodes in the two FlexE cross-connection rings, if a link fault occurs in the common node, a node adjacent to the common node may transmit data from one FlexE cross-connection ring to another FlexE cross-connection ring by using the ring-shaped protection path. Therefore, reliability of the ring network including the at least two FlexE cross-connection rings is improved.

18 Claims, 32 Drawing Sheets

(56) References Cited

U.S. PATENT DOCUMENTS

| | | | | |
|---|---|---|---|---|
| 2011/0286348 | A1* | 11/2011 | Yamasaki | H04L 43/08 370/252 |
| 2012/0207017 | A1* | 8/2012 | Ceccarelli | H04L 12/437 370/227 |
| 2013/0170359 | A1* | 7/2013 | Ino | H04L 12/437 370/241 |
| 2013/0194913 | A1* | 8/2013 | Sun | H04L 41/0654 370/223 |
| 2014/0301185 | A1* | 10/2014 | Chen | H04L 12/437 370/225 |
| 2014/0313893 | A1* | 10/2014 | Zhang | H04L 12/42 370/235 |
| 2015/0180788 | A1* | 6/2015 | Kompella | H04L 45/00 370/236.2 |
| 2015/0271050 | A1* | 9/2015 | Zhang | H04L 45/02 370/255 |
| 2016/0204976 | A1* | 7/2016 | Singh | H04L 12/40 370/216 |
| 2016/0308709 | A1* | 10/2016 | Fernandez-Palacios Gimenez | H04L 12/6418 |
| 2017/0005742 | A1* | 1/2017 | Gareau | H04J 3/1611 |
| 2017/0005901 | A1* | 1/2017 | Gareau | H04L 43/10 |
| 2017/0006360 | A1* | 1/2017 | Gareau | H04L 49/351 |
| 2017/0041216 | A1* | 2/2017 | Fu | H04L 45/22 |
| 2017/0155575 | A1* | 6/2017 | Bertucci | H04L 12/42 |
| 2017/0272308 | A1 | 9/2017 | Stone et al. | |
| 2018/0013511 | A1* | 1/2018 | Hussain | G02B 6/12033 |
| 2018/0167160 | A1* | 6/2018 | Gareau | H04L 1/0041 |
| 2021/0377103 | A1* | 12/2021 | Li | H04J 3/1658 |

FOREIGN PATENT DOCUMENTS

| | | | |
|---|---|---|---|
| CN | 108075903 | A | 5/2018 |
| CN | 108156074 | A | 6/2018 |
| CN | 108347317 | A | 7/2018 |
| CN | 108809674 | A | 11/2018 |
| EP | 2736203 | A1 | 5/2014 |
| EP | 3013017 | A1 | 4/2016 |
| EP | 3113502 | A1 | 1/2017 |
| JP | 2006129530 | A | 5/2006 |
| JP | 2012195707 | A | 10/2012 |
| JP | 2013-081109 | A * | 5/2013 |
| JP | 2013081109 | A | 5/2013 |
| JP | 2013157987 | A | 8/2013 |
| JP | 2016536906 | A | 11/2016 |
| JP | 2018157519 | A | 10/2018 |
| WO | 2009069229 | A1 | 6/2009 |
| WO | 2011080829 | A1 | 7/2011 |
| WO | 2018120914 | A1 | 7/2018 |

OTHER PUBLICATIONS

R. Vilalta et al., Network Slicing Using Dynamic Flex Ethernet over Transport Networks, 2017 European Conference on Optical Communication (ECOC), 3 pages.

Zhan Zhiguo et al., Transport Network Based on Flexible Ethernet Technologym Telecom Information, Oct. 17, 2017, with the English Absract, 4 pages.

IEEE Std 802.3TM-2018, IEEE Standard for Ethernet LAN/MAN Standards Committee of the, IEEE Computer Society, Approved Jun. 14, 2018, total 5600 pages.

ITU-T G.8132/Y.1383(Aug. 2017), Series G: Transmission Systems and Media, Digital Systems and Networks Packet over Transport aspects-MPLS over Transport aspects, Series Y: Global Information Infrastructure, Internet Protocol Aspects, Next-Generation Networks, Internet of Things and Smart Cities, Internet protocol aspects—Transport, MPLS-TP shared ring protection, total 26 pages.

* cited by examiner

| Bit | Field |
|---|---|
| 0 | |
| 1 | 0 |
| 2 | |
| 3 | |
| 4 | |
| 5 | 0x4B |
| 6 | |
| 7 | |
| 8 | |
| 9 | |
| 10 | Reserved |
| 11 | |
| 12 | |
| 13 | |
| 14 | Type |
| 15 | |
| 16 | |
| 17 | |
| 18 | |
| 19 | |
| 20 | |
| 21 | Value 1 |
| 22 | |
| 23 | |
| 24 | |
| 25 | |
| 26 | |
| 27 | |
| 28 | |
| 29 | |
| 30 | Value 2 |
| 31 | |
| 32 | |
| 33 | |
| 34 | |
| 35 | 0xC |
| 36 | |
| 37 | |
| 38 | |
| 39 | 0x0 |
| 40 | |
| 41 | |
| 42 | |
| 43 | |
| 44 | |
| 45 | Value 3 |
| 46 | |
| 47 | |
| 48 | |
| 49 | |
| 50 | |
| 51 | |
| 52 | |
| 53 | Value 4 |
| 54 | |
| 55 | |
| 56 | |
| 57 | |
| 58 | |
| 59 | Sequence |
| 60 | |
| 61 | |
| 62 | |
| 63 | CRC |
| 64 | |
| 65 | |

FIG. 30

COMMUNICATION METHOD AND APPARATUS

CROSS-REFERENCE TO RELATED APPLICATIONS

This application is a continuation of International Application No. PCT/CN2019/121841, filed on Nov. 29, 2019, which claims priority to Chinese Patent Application No. 201811505586.1, filed on Dec. 10, 2018. The disclosures of the aforementioned applications are hereby incorporated by reference in their entireties.

TECHNICAL FIELD

This application relates to the communications field, and in particular, to a ring network protection method and an apparatus that are applied to a flexible Ethernet cross-connection ring.

BACKGROUND

Flexible Ethernet (FlexE) is a new type of Ethernet developed based on conventional Ethernet. In the FlexE, data is transmitted through a FlexE tunnel. To improve FlexE reliability, an available method is to establish an end-to-end (E2E) protection path, in other words, establish a backup FlexE tunnel. When a fault occurs on a working path (a FlexE tunnel in use), one end of the E2E transmission path may transmit data by using the protection path, where the one end of the E2E transmission path is, for example, a provider edge (PE) device. However, if a fault occurs on the protection path as well, the FlexE cannot transmit data. Consequently, reliability of the FlexE decreases.

For a ring network using FlexE technology, providing a more reliable and effective ring network protection method is a technical problem that needs to be resolved currently.

SUMMARY

This application provides a communication method and a communication apparatus that are applied to a flexible Ethernet cross-connection ring. Reliability of FlexE can be enhanced by configuring a protection path between two adjacent network devices.

According to a first aspect, this application provides a communication method, applied to a ring network, where the ring network includes a first FlexE cross-connection ring and a second FlexE cross-connection ring, the first FlexE cross-connection ring includes a first network device, a second network device, and a third network device, and the second FlexE cross-connection ring includes a fourth network device, the first network device, and the second network device, where the first network device is adjacent to the second network device, the first network device is adjacent to the third network device, and the first network device is adjacent to the fourth network device; the first network device and the second network device are intersection nodes of the first FlexE cross-connection ring and the second FlexE cross-connection ring; there is a first FlexE link group between the first network device and the third network device, there is a second FlexE link group between the first network device and the fourth network device, there is a third FlexE link group between the first network device and the second network device, the first FlexE link group is used to carry a first client and a fifth client; the second FlexE link group is used to carry a second client and a sixth client, the third FlexE link group is used to carry a third client and a fourth client, the third client is used to transmit data within the first FlexE cross-connection ring, and the fourth client is used to transmit data within the second FlexE cross-connection ring; and the method includes: determining, by the first network device, that a fault occurs in the first FlexE link group; deleting, by the first network device, a FlexE cross-connection between the third client and the fifth client; and establishing, by the first network device, a FlexE cross-connection between the third client and the second client or the fourth client.

The first FlexE link group may be one link group, or may be a plurality of link groups. When the first FlexE link group is one link group, the first client and the fifth client are carried on a same link group; or when the first FlexE link group is a plurality of link groups, the first client and the fifth client may be carried on a same link group or different link groups. The second FlexE link group and the third FlexE link group also have the same feature as the first FlexE link group.

Because each of two adjacent FlexE cross-connection rings has a ring-shaped protection path, after a fault occurs on a working path, a common node (for example, the first network device) that carries the working path may forward service data through the protection paths of the two FlexE cross-connection rings. For a FlexE cross-connection ring in the conventional technology, only a working path and an E2E protection path exist between a sending node and a receiving node. Generally, a node that carries the working path does not carry the E2E protection path. If a fault occurs in the working path carried by the common node, the working node cannot forward service data by using the protection path. Therefore, the FlexE cross-connection ring and an automatic protection switching method based on the FlexE cross-connection ring that are provided in this application improve reliability of the ring network.

In a possible design, after establishing, by the first network device, a FlexE cross-connection between the third client and the second client or the fourth client, the method further includes: receiving, by the first network device by using the third client, first FlexE data sent by the third network device; and forwarding, by the first network device, the first FlexE data by using the second client or the fourth client.

The FlexE data is a code block that complies with a FlexE protocol. The first network device sends service data (for example, the first FlexE data) back to the third network device by using a protection client, and the third network device forwards the service data by using a protection path, thereby improving reliability of the ring network.

In a possible design, after the link fault in the first FlexE link group is rectified, the method further includes: deleting, by the first network device, a FlexE cross-connection between the third client and the second client or the fourth client; and establishing, by the first network device, a FlexE cross-connection between the first client and the second client or the fourth client.

A working path is usually a preferred transmission path between network devices. After the link fault in the first FlexE link group is rectified, the first network device may choose to switch a transmission path for the service data to a working path, so that a preferred transmission resource can be provided for the service data.

In a possible design, after establishing, by the first network device, a FlexE cross-connection between the first client and the second client or the fourth client, the method further includes: receiving, by the first network device by using the first client, second FlexE data sent by the third network device; and forwarding, by the first network device, the second FlexE data by using the second client or the fourth client.

After completing path switching, the first network device forwards the second FlexE data by using the working path, so that a preferred transmission resource can be provided for the second FlexE data.

In a possible design, the first FlexE link group is used to carry at least two clients, the at least two clients form one client binding group, the client binding group includes the first client, operation, administration and maintenance OAM detection is deployed on at least one client in the client binding group, and OAM detection is not deployed on at least one client in the client binding group. The determining, by the first network device, that a fault occurs in the first FlexE link group includes: determining, by the first network device based on the OAM detection deployed on the at least one client in the client binding group, that the fault occurs in the first FlexE link group.

One working client group may be configured for a plurality of working clients between the first network device and the third network device, and one protection client group may be configured for a plurality of protection clients between the first network device and the third network device. If the first network device does not receive a response packet after sending an OAM packet to the third network device by using one client in the client group, the first network device may determine that a fault occurs in a FlexE link group (for example, the first FlexE link group) corresponding to the client group, and does not need to send an OAM packet by using each working client or protection client, thereby reducing consumption of transmission resources.

In a possible design, the first link group is further used to carry a seventh client and an eighth client, the third link group is further used to carry a ninth client, and the method further includes: determining, by the first network device, that a fault occurs in the third FlexE link group; deleting, by the first network device, a FlexE cross-connection between the seventh client and the ninth client; and establishing, by the first network device, a FlexE cross-connection between the seventh client and the eighth client.

In the solution provided in this embodiment, a protection path between network devices is established in the first FlexE cross-connection ring. In this way, when a fault occurs in a transmission path (for example, the third FlexE link group) between the first network device and the second network device, the first network device may establish a FlexE cross-connection between a working client (for example, the seventh client) and a protection client (for example, the eighth client) and send service data back to the third network device by using the protection client, so that a backup transmission channel is provided for the service data, thereby improving reliability of the first FlexE cross-connection ring. A similar assurance mechanism may also be established in the second FlexE cross-connection ring.

In a possible design, after the link fault in the third FlexE link group is rectified, the method further includes: deleting, by the first network device, the FlexE cross-connection between the seventh client and the eighth client; and establishing, by the first network device, a FlexE cross-connection between the seventh client and the ninth client.

A path corresponding to the ninth client is a working path. A working path is usually a preferred transmission path between network devices. After the link fault in the third FlexE link group is rectified, the first network device may choose to switch a transmission path for the service data to a working path, so that a preferred transmission resource can be provided for the service data.

In a possible design, the third FlexE link group is used to carry at least two clients, the at least two clients form one client binding group, the client binding group includes the ninth client, OAM detection is deployed on at least one client in the client binding group, and OAM detection is not deployed on at least one client in the client binding group. The determining, by the first network device, that a fault occurs in the third FlexE link group includes: determining, by the first network device based on the OAM detection deployed on the at least one client in the client binding group, that the fault occurs in the third FlexE link group.

One working client group may be configured for a plurality of working clients between the first network device and the second network device, and one protection client group may be configured for a plurality of protection clients between the first network device and the second network device. If the first network device does not receive a response packet after sending an OAM packet to the second network device by using one client in the client group, the first network device may determine that a fault occurs in a FlexE link group (for example, the third FlexE link group) corresponding to the client group, and does not need to send an OAM packet by using each working client or protection client, thereby reducing consumption of transmission resources.

According to a second aspect, this application provides another communication method, applied to a ring network, where the ring network includes a first FlexE cross-connection ring and a second FlexE cross-connection ring, the first FlexE cross-connection ring includes a first network device, a second network device, and a third network device, and the second FlexE cross-connection ring includes a fourth network device, the first network device, and the second network device, where the first network device is adjacent to the second network device, the first network device is adjacent to the third network device, and the first network device is adjacent to the fourth network device; the first network device and the second network device are intersection nodes of the first FlexE cross-connection ring and the second FlexE cross-connection ring; there is a first FlexE link group between the first network device and the third network device, there is a second FlexE link group between the first network device and the second network device, there is a third FlexE link group between the first network device and the second network device, the first FlexE link group is used to carry a first client and a fifth client; the second FlexE link group is used to carry a second client and a sixth client, the third FlexE link group is used to carry a third client and a fourth client, the third client is used to transmit data within the first FlexE cross-connection ring, the fourth client is used to transmit data within the second FlexE cross-connection ring, the second network device further carries a seventh client and an eighth client, the seventh client is used to transmit data within the first FlexE cross-connection ring, and the eighth client is used to transmit data within the second FlexE cross-connection ring; and the method includes: determining, by the second network device, that a fault occurs in the first network device; deleting, by the second network device, a FlexE cross-connection between the third client and the seventh client; deleting, by the second network device, a FlexE cross-connection ring between the fourth client and the eighth client; and establishing, by the second network device, a FlexE cross-connection between the seventh client and the eighth client.

The fifth client, the third client, and the seventh client are clients on a ring-shaped protection path of the first FlexE cross-connection ring, and the fourth client, the sixth client, and the eighth client are clients on a ring-shaped protection path of the second FlexE cross-connection ring. The first network device carries a working path between the first FlexE cross-connection ring and the second FlexE cross-connection ring. When a fault occurs in a common node (for example, the first network device) of the first FlexE cross-connection ring and the second FlexE cross-connection ring, the first FlexE cross-connection ring and the second FlexE cross-connection ring need to determine another common node (for example, the second network device), and establish an association between protection paths of the two FlexE cross-connection rings by using the another common node, so that data is forwarded by using the protection paths of the two FlexE cross-connection rings.

Because each of two adjacent FlexE cross-connection rings has a ring-shaped protection path, after the fault occurs in the first network device, a network device that is in the first FlexE cross-connection ring, that is adjacent to the first network device, and that carries the working path may forward service data by using the ring-shaped protection path. For a FlexE cross-connection ring in the conventional technology, only a working path and an E2E protection path exist between a sending node and a receiving node. Generally, a network device that carries the working path does not carry the E2E protection path. If a fault occurs in the first network device, a network device that is in the first FlexE cross-connection ring, that is adjacent to the first network device, and that carries the working path cannot forward service data by using the protection path. Therefore, the FlexE cross-connection ring and an automatic protection switching method based on the FlexE cross-connection ring that are provided in this application improve reliability of the ring network.

In a possible design, after establishing, by the first network device, a FlexE cross-connection between the third client and the second client or the fourth client, the method further includes: receiving, by the first network device, first FlexE data by using the seventh client; and forwarding, by the first network device, the first FlexE data by using the eighth client.

The FlexE data is a code block that complies with a FlexE protocol. The first network device implements data forwarding between two FlexE cross-connection rings by using protection clients of the two FlexE cross-connection rings, thereby improving reliability of the ring network.

In a possible design, after the fault in the first network device is rectified, the method further includes: deleting, by the second network device, a FlexE cross-connection between the seventh client and the eighth client; establishing, by the second network device, a FlexE cross-connection between the seventh client and the third client; and establishing, by the second network device, a FlexE cross-connection between the eighth client and the fourth client.

After the fault in the first network device is rectified, the first network device may forward data between the two FlexE cross-connection rings by using the working path, and the second network device restores a ring-shaped protection path of each of the two FlexE cross-connection rings, to continue to ensure reliability of the ring network.

According to a third aspect, this application further provides a communication method, applied to a ring network, where the ring network includes a first FlexE cross-connection ring and a second FlexE cross-connection ring, the first FlexE cross-connection ring includes a first network device, a second network device, and a third network device, and the second FlexE cross-connection ring includes a fourth network device, the fifth network device, and the first network device, where the first network device is adjacent to the second network device, the first network device is adjacent to the third network device, the first network device is adjacent to the fourth network device, and the first network device is adjacent to the fifth network device; the first network device is an intersection node of the first FlexE cross-connection ring and the second FlexE cross-connection ring; there is a first FlexE link group between the first network device and the third network device, there is a second FlexE link group between the first network device and the fourth network device, there is a third FlexE link group between the first network device, the second network device and the fifth network device, the first FlexE link group is used to carry a first client and a fifth client; the second FlexE link group is used to carry a second client and a sixth client, the third FlexE link group is used to carry a third client and a fourth client, the third client is used to transmit data within the first FlexE cross-connection ring, and the fourth client is used to transmit data within the second FlexE cross-connection ring; and the method includes: determining, by the first network device, that a fault occurs in the first FlexE link group; deleting, by the first network device, a FlexE cross-connection between the third client and the fifth client; and establishing, by the first network device, a FlexE cross-connection between the third client and the second client or the fourth client.

The first FlexE link group may be one link group, or may be a plurality of link groups. For example, when the first FlexE link group is one link group, the first client and the fifth client are carried on a same link group; or when the first FlexE link group is a plurality of link groups, the first client and the fifth client may be carried on a same link group or different link groups. Similarly, the second FlexE link group may be one link group, or may be a plurality of link groups. The third FlexE link group may be one link group, or may be a plurality of link groups.

Because each of two adjacent FlexE cross-connection rings has a ring-shaped protection path, after a fault occurs on a working path, a common node (for example, the first network device) that carries the working path may forward service data through the protection paths of the two FlexE cross-connection rings. For a FlexE cross-connection ring in the conventional technology, only a working path and an E2E protection path exist between a sending node and a receiving node. Generally, a node that carries the working path does not carry the E2E protection path. If a fault occurs in the working path carried by the common node, the working node cannot forward service data by using the protection path. Therefore, the FlexE cross-connection ring and an automatic protection switching method based on the FlexE cross-connection ring that are provided in this application improve reliability of the ring network.

In a possible design, after establishing, by the first network device, a FlexE cross-connection between the third client and the second client or the fourth client, the method further includes: receiving, by the first network device by using the third client, first FlexE data sent by the third network device; and forwarding, by the first network device, the first FlexE data by using the second client or the fourth client.

The FlexE data is a code block that complies with a FlexE protocol. The first network device sends service data (for example, the first FlexE data) back to the third network device by using a protection client, and the third network device forwards the service data by using a protection path, thereby improving reliability of the ring network.

In a possible design, after the link fault in the first FlexE link group is rectified, the method further includes: deleting, by the first network device, a FlexE cross-connection between the third client and the second client or the fourth client; and establishing, by the first network device, a FlexE cross-connection between the first client and the second client or the fourth client.

A working path is usually a preferred transmission path between network devices. After the link fault in the first FlexE link group is rectified, the first network device may choose to switch a transmission path for the service data to a working path, so that a preferred transmission resource can be provided for the service data.

In a possible design, after the establishing, by the first network device, a FlexE cross-connection between the first client and the second client or the fourth client, the method further includes: receiving, by the first network device by using the first client, second FlexE data sent by the third network device; and forwarding, by the first network device, the second FlexE data by using the second client or the fourth client.

After completing path switching, the first network device forwards the second FlexE data by using the working path, so that a preferred transmission resource can be provided for the second FlexE data.

In a possible design, the first FlexE link group is used to carry at least two clients, the at least two clients form one client binding group, the client binding group includes the first client, operation, administration and maintenance OAM detection is deployed on at least one client in the client binding group, and OAM detection is not deployed on at least one client in the client binding group. The determining, by the first network device, that a fault occurs in the first FlexE link group includes: determining, by the first network device based on the OAM detection deployed on the at least one client in the client binding group, that the fault occurs in the first FlexE link group.

One working client group may be configured for a plurality of working clients between the first network device and the third network device, and one protection client group may be configured for a plurality of protection clients between the first network device and the third network device. If the first network device does not receive a response packet after sending an OAM packet to the third network device by using one client in the client group, the first network device may determine that a fault occurs in a FlexE link group (for example, the first FlexE link group) corresponding to the client group, and does not need to send an OAM packet by using each working client or protection client, thereby reducing consumption of transmission resources.

In a possible design, the first link group is further used to carry a seventh client and an eighth client, the third link group is further used to carry a ninth client, and the method further includes: determining, by the first network device, that a fault occurs in the third FlexE link group; deleting, by the first network device, a FlexE cross-connection between the seventh client and the ninth client; and establishing, by the first network device, a FlexE cross-connection between the seventh client and the eighth client.

In the solution provided in this embodiment, a protection path between network devices is established in the first FlexE cross-connection ring. In this way, when a fault occurs in a transmission path (for example, the third FlexE link group) between the first network device and the second network device, the first network device may establish a FlexE cross-connection between a working client (for example, the seventh client) and a protection client (for example, the eighth client) and send service data back to the third network device by using the protection client, so that a backup transmission channel is provided for the service data, thereby improving reliability of the first FlexE cross-connection ring. A similar assurance mechanism may also be established in the second FlexE cross-connection ring.

In a possible design, after the link fault in the third FlexE link group is rectified, the method further includes: deleting, by the first network device, the FlexE cross-connection between the seventh client and the eighth client; and establishing, by the first network device, a FlexE cross-connection between the seventh client and the ninth client.

A path corresponding to the ninth client is a working path. A working path is usually a preferred transmission path between network devices. After the link fault in the third FlexE link group is rectified, the first network device may choose to switch a transmission path for the service data to a working path, so that a preferred transmission resource can be provided for the service data.

In a possible design, the third FlexE link group is used to carry at least two clients, the at least two clients form one client binding group, the client binding group includes the ninth client, OAM detection is deployed on at least one client in the client binding group, and OAM detection is not deployed on at least one client in the client binding group. The determining, by the first network device, that a fault occurs in the third FlexE link group includes: determining, by the first network device based on the OAM detection deployed on the at least one client in the client binding group, that the fault occurs in the third FlexE link group.

One working client group may be configured for a plurality of working clients between the first network device and the second network device, and one protection client group may be configured for a plurality of protection clients between the first network device and the second network device. If the first network device does not receive a response packet after sending an OAM packet to the second network device by using one client in the client group, the first network device may determine that a fault occurs in a FlexE link group (for example, the third FlexE link group) corresponding to the client group, and does not need to send an OAM packet by using each working client or protection client, thereby reducing consumption of transmission resources.

According to a fourth aspect, this application provides a communication apparatus, including a memory, and the memory includes a computer-readable instruction; the apparatus further includes a processor connected to the memory, and the processor is configured to execute the computer-readable instruction to perform an operation in the first aspect or any possible design of the first aspect, an operation in the second aspect or any possible design of the second aspect, or, an operation in the third aspect and any possible design of the third aspect.

According to a fifth aspect, this application further provides a computer-readable storage medium, and computer program code is stored in the computer-readable storage medium. When the computer program code is executed by a processing unit or a processor, a communication apparatus is enabled to perform an operation in the first aspect and any possible design of the first aspect, an operation in the second aspect and any possible design of the second aspect, or an operation in the third aspect and any possible design of the third aspect.

According to a sixth aspect, this application further provides a chip, and an instruction is stored on the chip. When the instruction is run on a communication apparatus or a network device, the chip is enabled to perform an operation in the first aspect and any possible design of the first aspect, an operation in the second aspect and any possible design of the second aspect, or an operation in the third aspect and any possible design of the third aspect.

According to a seventh aspect, this application further provides a computer program product, and the computer program product includes computer program code. When the computer program code is executed by a processor of a communication apparatus, the communication apparatus is enabled to perform an operation in the first aspect and any possible design of the first aspect, an operation in the second aspect and any possible design of the second aspect, or an operation in the third aspect and any possible design of the third aspect.

According to an eighth aspect, this application further provides a network device, configured to perform an operation in the first aspect and any possible design of the first aspect, an operation in the second aspect and any possible design of the second aspect, or an operation in the third aspect and any possible design of the third aspect.

According to a ninth aspect, this application further provides a network device, including the communication apparatus in the fourth aspect.

BRIEF DESCRIPTION OF DRAWINGS

FIG. 30 is a schematic diagram of an OAM packet format according to this application;

DESCRIPTION OF EMBODIMENTS

Figure 1:
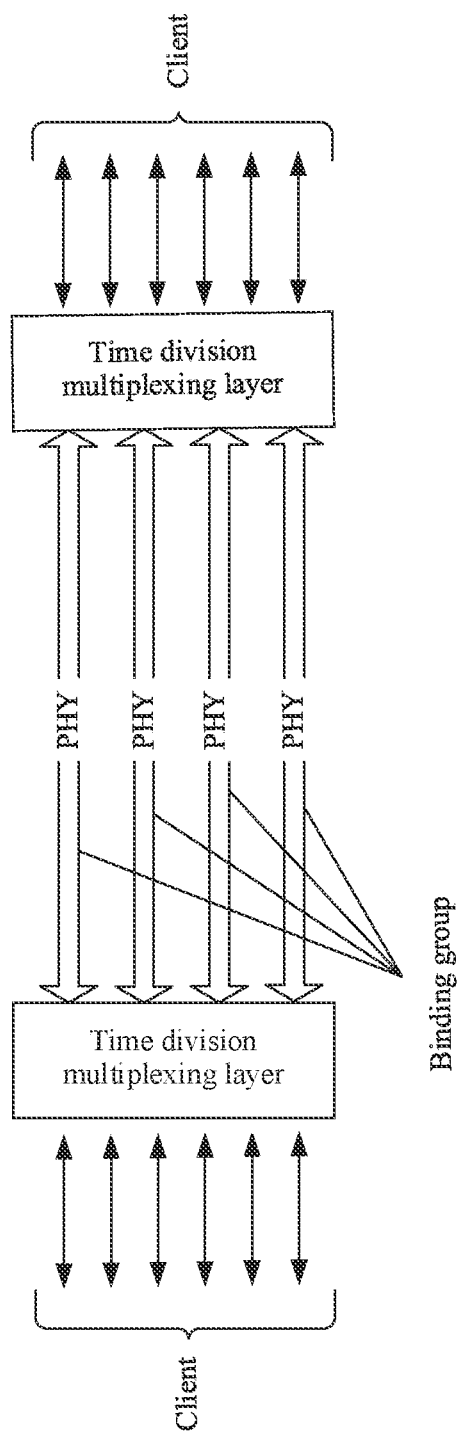
FIG. 1 is a schematic diagram of a FlexE transmission mode applicable to this application.

Unless otherwise specified, ordinal numbers such as "1", "2", "3", "4", "5", "6", "7", "8", "first", and "second" mentioned in this application are used to distinguish a plurality of objects, and are not used to limit the sequence of a plurality of objects. For example, client 1, client 2, client 3, client 4, client 5, client 6, client 7, and client 8 represent eight different clients, and there is no other limitation. Node 1, node 2, node 3, and node 4 represent four different nodes, and there is no other limitation. Link group 1, link group 2, and link group 3 represent three different link groups, and there is no other limitation. A first FlexE cross-connection ring and a second FlexE cross-connection ring represent two different FlexE cross-connection rings, and there is no other limitation.

A node in this application may also be referred to as a network device or a network element. The node may be a router, a packet transport network device, a switch, a firewall, or the like. For ease of description, in this application, the devices mentioned above are collectively referred to as nodes.

The following describes technical solutions in this application with reference to accompanying drawings.

FIG. 1 is a schematic diagram of a FlexE transmission mode applicable to this application.

As shown in FIG. 1, on the basis of conventional Ethernet, concepts such as a FlexE link group (FlexE Group), a client (client), and a flexible Ethernet time division multiplexing layer (FlexE shim, "time division multiplexing layer" for short below) are introduced to FlexE. For ease of understanding of the technical solutions in this application, first, concepts in this application are briefly described.

A FlexE link group may also be referred to as a binding group, and the FlexE link group may be explained as a function module composed of a plurality of physical layers (PHY). A FlexE link group in this application includes at least one link. For example, a FlexE link group may include 1 to 254 PHYs that support a rate of 100 gigabit Ethernet (GE). The PHY may be defined as mechanical, electronic, functional, and normative features provided for establishing, maintaining, and removing a physical link required for data transmission. The PHY may also be defined as a module having the foregoing features. For example, PHYs may be physical layer working components at a sending end and a receiving end and an optical fiber located between the sending end and the receiving end. For example, the physical layer working components are physical layer interface devices.

A plurality of PHYs (namely, links) included in each FlexE link group have a logical binding relationship. The logical binding relationship means that there may be no physical connection between different PHYs. Therefore, a plurality of PHYs in the FlexE link group may be physically independent. A network device in FlexE may identify, by using numbers of PHYs, links included in one FlexE link group, to logically bind a plurality of PHYs. For example, each PHY number may be identified by using a number ranging from 1 to 254, and 0 and 255 are reserved numbers. One PHY number may correspond to one port on the network device. Two adjacent network devices need to use a same number to identify a same PHY. Numbers of PHYs included in one FlexE link group do not need to be consecutive. Generally, there is one FlexE link group between two network devices. However, it is not limited in this application that there is only one FlexE link group between two network devices. In other words, there may be a plurality of FlexE link groups between two network devices. One PHY may be used to carry at least one client, and one client may be transmitted on at least one PHY.

A client may also be referred to as a client service. A client can be interpreted as an Ethernet flow based on one physical address. Clients that are sent by using a same binding group need to share a same clock, and these clients need to be adapted based on allocated timeslot rates. Bandwidth overheads of each client may be adapted by inserting/deleting an idle (idle) block. An identifier of a client is called a client ID or a client identifier.

Time division multiplexing layer: A main function of a time division multiplexing layer is to slice data based on a same clock, encapsulate sliced data into pre-divided timeslots (slot), and then map, based on a preconfigured timeslot configuration table, divided timeslots to PHYs in a binding group for transmission, where each timeslot is mapped to one PHY in the binding group.

FlexE transmits data based on a time division multiplexing (time division multiplexing, TDM) technology, and an Ethernet packet is encoded, at a physical coding sublayer, into code blocks of a size of 64B/66B ("B" is short for "bit"), and these code blocks are mapped to a plurality of different PHYs based on timeslots.

FlexE data described in this application may also be referred to as a code block. As described above, Ethernet packets are encoded into the code blocks of the size of 64B/66B at the physical coding sublayer, and these code blocks are mapped to the plurality of different PHYs based on the timeslots.

Figure 2:
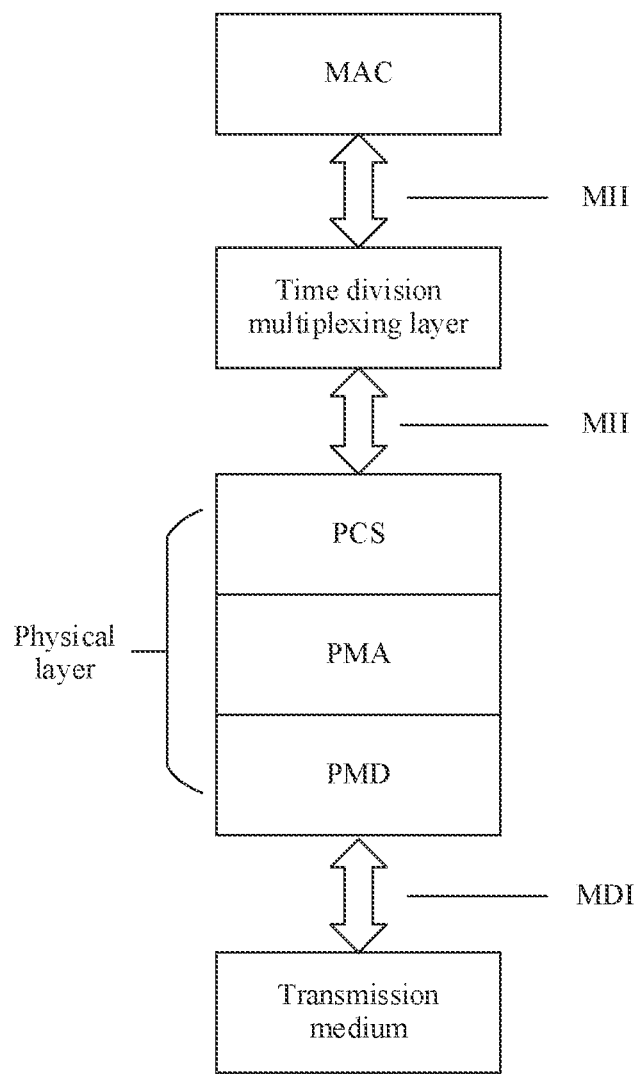
FIG. 2 is a schematic diagram of a partial architecture applicable to FlexE in this application.

FIG. 2 is a schematic diagram of a partial architecture of FlexE applicable to this application.

As shown in FIG. 2, the partial architecture of the FlexE includes a medium access control (MAC) sublayer, a time division multiplexing layer, and a physical layer. The MAC sublayer is a sublayer of a data link layer, and is connected to a logical link control sublayer in the upstream. The physical layer may be further divided into a physical coding sublayer (physical coding sublayer, PCS), a physical medium attachment (physical medium attachment, PMA) sublayer, and a physical medium dependent (PMD) sublayer. The MAC sublayer is connected to the time division multiplexing layer by using a medium independent interface (MII), and the time division multiplexing layer is connected to the physical layer by using a medium independent interface. The physical layer is connected to a transmission medium in the downstream, and the physical layer is connected to the transmission medium by using an MDI. Functions of the foregoing layers and interfaces are implemented by corresponding chips or modules. For example, functions corresponding to the PCS, the PMA sublayer, and the PMD sublayer may be separately implemented by different PHYs.

In a signal sending process, the PCS is configured to perform operations, for example, encoding, scrambling (scrambled), overhead (OH) inserting, and alignment marker (AM) inserting, on the data. In a signal receiving process, the PCS performs reverse processing processes of the foregoing steps. Signals may be sent and received by different function modules of the PCS.

Main functions of the PMA sublayer are link monitoring, carrier monitoring, encoding and decoding, sending clock synthesis, and receiving clock recovery. Main functions of the PMD sublayer are scrambling/descrambling and encoding/decoding a data stream, and performing direct current restoration and adaptive equalization on a received signal.

It should be understood that the foregoing architecture is merely an example for description, and an architecture applicable to FlexE in this application is not limited thereto. For example, there may be a reconciliation sublayer (RS) between the MAC sublayer and the time division multiplexing layer, and the reconciliation sublayer is used to provide a signal mapping mechanism between the MII and the MAC sublayer. A forward error correction (FEC) sublayer may further exist between the PCS and the PMA sublayer, to enhance reliability of sent data.

Figure 3:
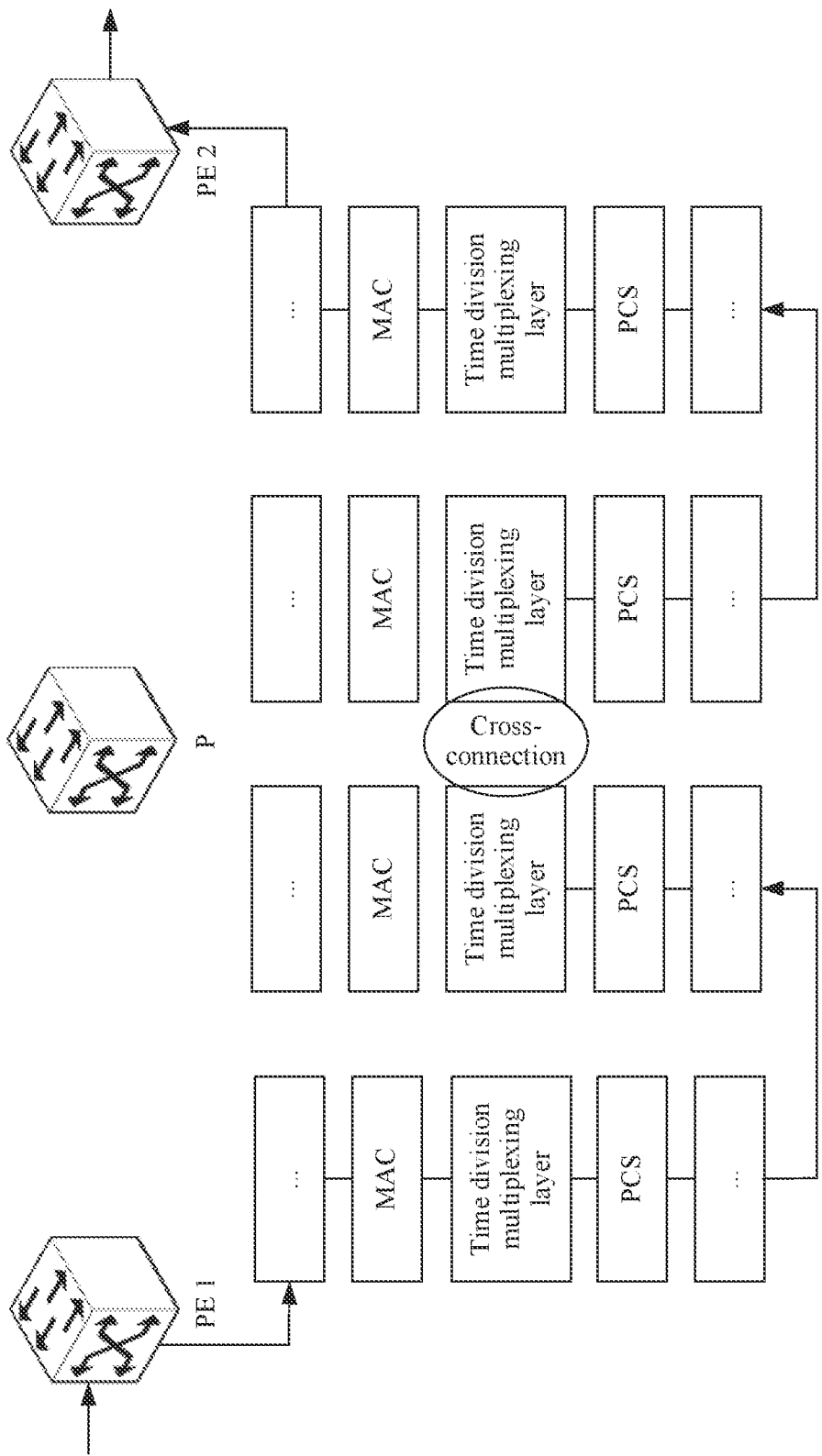
FIG. 3 shows a schematic diagram of a FlexE cross-connection transmission technology applicable to this application.

Based on the foregoing architecture, FIG. 3 shows a schematic diagram of a FlexE cross-connection (cross) transmission technology applicable to this application.

A provider edge (PE) device PE 1 receives, by using a user network interface (UNI), an Ethernet packet sent by a user, and sends the Ethernet packet. For example, the Ethernet packet is encoded, at a physical coding sublayer, into data blocks of a size of 64B/66B, and these data blocks are mapped to PHYs based on timeslots. After the mapped data blocks are processed at a physical layer, an overhead frame or an overhead multiframe is generated. The overhead frame or the overhead multiframe is transmitted to a service provider (P) device over a transmission medium (for example, an optical fiber).

After obtaining the overhead frame or the overhead multiframe that includes the data blocks, the P device sends the overhead frame or the overhead multiframe from a unique output path at a time division multiplexing layer of the P device based on a FlexE cross-connection configuration. Therefore, FlexE cross-connection may also be explained as establishing a connection between an input path and an output path.

After receiving the overhead frame or overhead multiframe, PE 2 decodes the overhead frame or overhead multiframe to obtain the Ethernet packet sent by PE 1, and sends out the Ethernet packet by using a UNI of PE 2.

Forwarding and processing for data transmission in FlexE are performed at the physical layer, and there is no need to decapsulate data at a MAC sublayer. Therefore, compared with a multi-protocol label switching (MPLS) manner, forwarding efficiency is improved.

It should be noted that names of the P device and the PE device are different because locations of the P device and the PE device are different. When a P device obtains a to-be-transmitted Ethernet packet by using a UNI, the P device changes to a PE device. Correspondingly, when a PE device is used as a node that performs FlexE cross-connection processing, the PE device changes to a P device.

To improve FlexE transmission reliability, this application provides a communication method. The method is applied to a FlexE cross-connection ring including at least three nodes.

Figure 4:
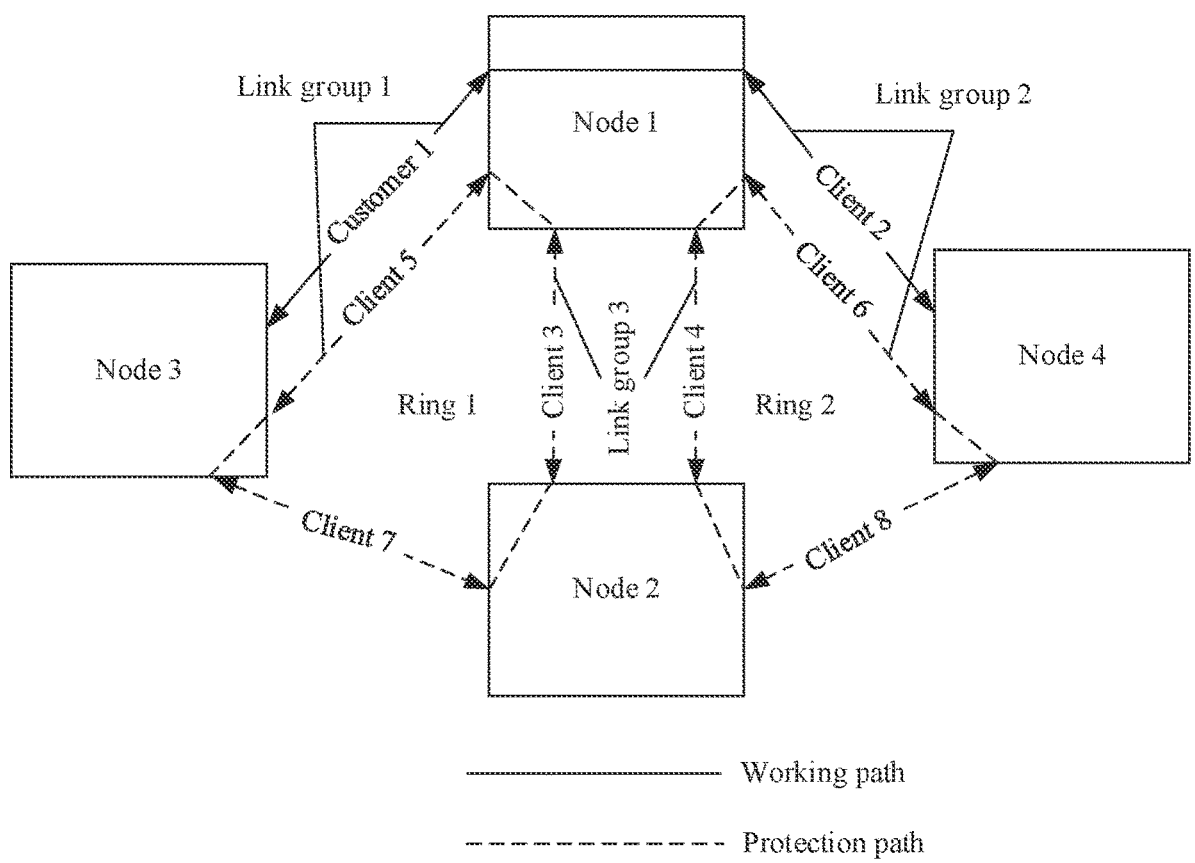
FIG. 4 is a schematic diagram of a first-type FlexE cross-connection ring according to this application.

FIG. 4 is a schematic diagram of a FlexE ring network (a ring Ethernet to which a FlexE cross-connection technology is applied) according to this application. A FlexE link group between node 1 and node 3 may be referred to as link group 1, a FlexE link group between node 1 and node 4 may be referred to as link group 2, and a FlexE link group between node 1 and node 2 may be referred to as link group 3. Each link group carries at least one working path and/or at least one protection path.

The working path described in this application may also be referred to as a working channel, and is a path that is configured by a system and that is used for service data transmission.

When a FlexE link group carries only a working path, the FlexE link group may be referred to as a working FlexE link group. The protection path described in this application may also be referred to as a protection channel, and is a backup path of a working path configured by a system, in other words, a path for transmitting service data in place of the working path when the working path cannot transmit service data. When a FlexE link group carries only the protection path, the FlexE link group may be referred to as a protection FlexE link group.

The FlexE ring network shown in FIG. 4 includes two FlexE cross-connection rings, each FlexE cross-connection ring includes three nodes, node 1 and node 2 are nodes shared by the two FlexE cross-connection rings, and a FlexE cross-connection ring in which node 3 is located is ring 1. A FlexE cross-connection ring in which node 4 is located is ring 2. In a case in which no service data is added to a ring, each node is, for example, a P device shown in FIG. 3. A working path and/or a protection path used to transmit data exists between the nodes. The working path and the protection path are data channels based on a physical link (for example, an optical fiber). In addition, both the working path and the protection path are bidirectional paths. For example, data may be transmitted from node 3 to node 1 by using a working path, and data may also be transmitted from node 1 to node 3 by using the working path. Different paths correspond to different clients. Therefore, a client identifier may be used to describe a working path or a protection path. A client corresponding to a working path may be referred to as a working client, for example, client 1 and client 2. A client corresponding to a protection path may be referred to as a protection client, for example, client 3, client 4, client 5, client 6, client 7, and client 8.

The foregoing working path and the protection path are preconfigured paths. When a sending end (for example, node 3) and a receiving end (for example, node 4) are located in different FlexE cross-connection rings, an E2E working path between the sending end and the receiving end, namely, a working path corresponding to client 1 and client 2, needs to be configured; a protection path in each FlexE cross-connection ring, namely, protection paths corresponding to client 3, client 5, and client 7, and protection paths corresponding to client 4, client 6, and client 8, further need to be configured.

Some timeslots are required when a node transmits data by using a client, and these timeslots are allocated to at least one PHY in a FlexE link group. A FlexE cross-connection is a timeslot cross-connection. For example, n timeslots allocated to client 1 exist in a PHY corresponding to client 1. m timeslots allocated to client 2 exist in a PHY corresponding to client 2. Node 1 receives, by using then timeslots occupied by client 1, data from the PHY corresponding to client 1. When forwarding the data to node 4, node 1 establishes a FlexE cross-connection between client 1 and client 2. The data is forwarded to node 4 by using the m timeslots occupied by client 2 and the PHY corresponding to client 2.

In a default state, the protection path is in a closed-loop state, and a FlexE cross-connection exists between clients corresponding to two protection paths. For example, a FlexE cross-connection exists between client 5 and client 3, a FlexE cross-connection exists between client 5 and client 7, and a FlexE cross-connection exists between client 7 and client 3, as shown by dotted lines in node 1, node 3 and node 2 in FIG. 4. When the working path is in an open-loop state, a FlexE cross-connection also exists between clients corresponding to two adjacent working paths. For example, a FlexE cross-connection exists between client 1 and client 2, as shown by a solid line in node 1 in FIG. 4.

After service data is added to a ring by using a UNI, a PE node (for example, node 3) may determine, by searching for a virtual local area network (VLAN) identifier corresponding to the service data, a corresponding FlexE interface (namely, client 1) to forward the service data.

Figure 5:
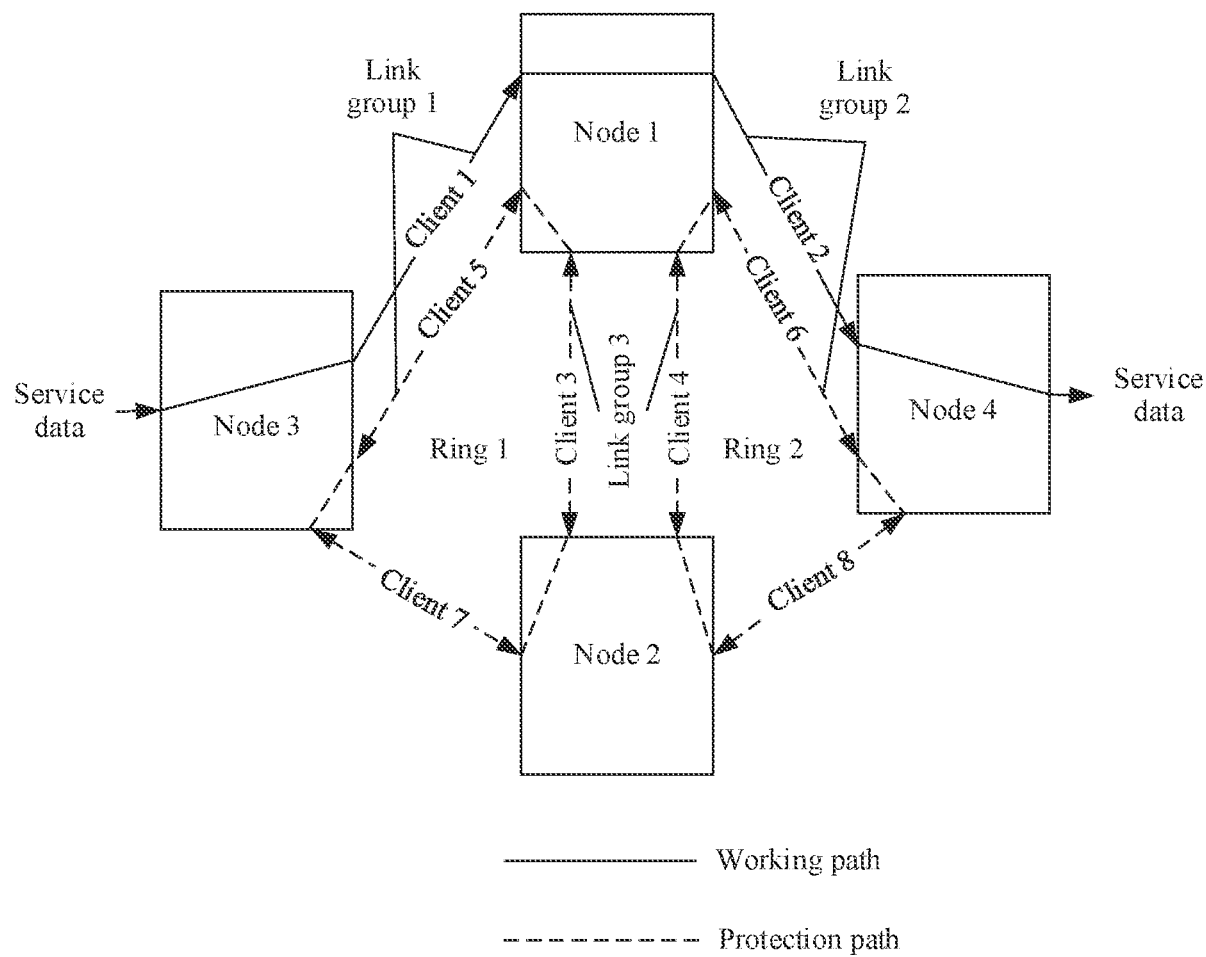
FIG. 5 is a schematic diagram of a data forwarding method of a first-type FlexE cross-connection ring in a normal state according to this application.

FIG. 5 shows a schematic diagram of a method for adding service data to a ring and dropping the service data from the ring according to this application.

After obtaining service data by using a UNI, node 3 performs adding processing, in other words, searches for a client corresponding to the service data. For example, if a destination address of the service data is node 4, node 3 may select a transmission path "node 3→node 1→node 4", and send the service data to node 1 by using client 1, where node 1 is used as an intersecting node of two FlexE cross-connection rings.

After receiving the service data by using client 1, node 1 sends out the service data by using client 2 based on a FlexE cross-connection between client 1 and client 2.

After receiving the service data by using client 2, node 4 performs dropping processing, in other words, sends out the service data by using a UNI of node 3.

A ring client for adding and a ring client for dropping data of each node may be pre-configured. For example, in the foregoing example, a ring client for adding and dropping data of node 3 may be set to client 1, and a ring client for adding and dropping data of node 4 may be set to client 2.

Taking node 3 as an example, after obtaining service data by using a UNI and determining a transmission path, node 3 may select client 1 from a plurality of clients based on a VLAN identifier corresponding to the service data to send the service data. In other words, when node 2 serves as a sending end, client 1 is a ring client for adding data. When node 3 serves as a receiving end and receives the service data from another node by using client 1, node 3 may perform dropping processing on the service data, and send out the service data by using the UNI. In other words, when node 3 serves as the receiving end, client 1 is the ring client for dropping data.

It should be noted that, the foregoing ring client for adding and ring client for dropping data of each node are configured in a case in which node 3 serves as the PE node. If node 3 does not serve as the PE node, the ring client for adding and ring client for dropping data of each node need to be reconfigured. In other words, in a FlexE cross-connection ring, a configuration of a ring client for adding data and a client for dropping data of each node is in a one-to-one correspondence with the PE node.

The forwarding process described above is a data forwarding process when all paths of the FlexE cross-connection ring are running properly. If a fault occurs in a FlexE link group between node 1 and node 3, node 1 may perform a method shown in FIG. 6 to complete data forwarding.

Figure 6:
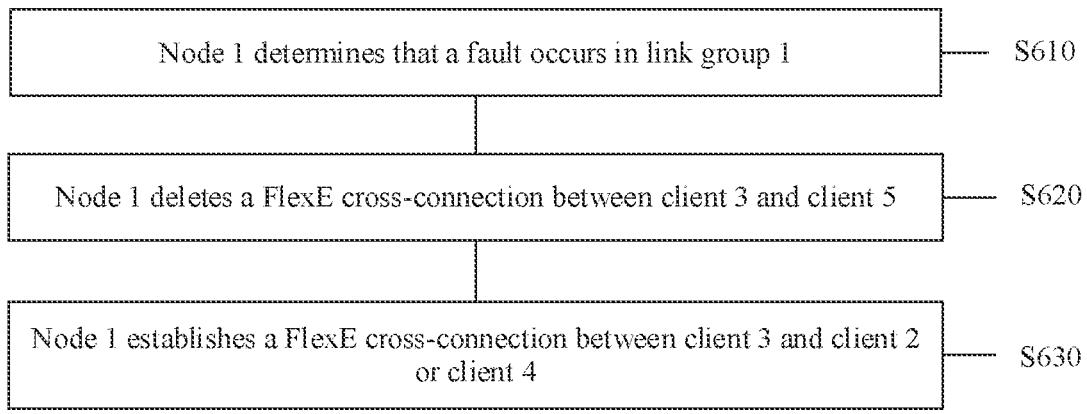
FIG. 6 is a schematic diagram of a communication method according to this application.

As shown in FIG. 6, the method 600 includes the following steps.

S610. Node 1 determines that a fault occurs in link group 1.

Node 1 may determine, based on an operation, administration and maintenance (OAM) function of FlexE, that the fault occurs in link group 1.

For example, after node 1 sends an OAM packet to node 3 by using client 1, if node 1 does not receive a response message of the OAM packet within N periods, node 1 determines that a fault occurs in link group 1. The OAM packet is used to check connectivity of a path between nodes.

For another example, if node 1 does not receive, within N periods, an OAM packet sent by node 3, node 1 determines that a fault occurs in link group 1.

The foregoing method that node 1 determines that a fault occurs in link group 1 is merely an example for description. A specific manner in which node 1 determines that a fault occurs in link group 1 is not limited in this application.

S620. Node 1 deletes a FlexE cross-connection between client 3 and client 5.

S630. Node 1 establishes a FlexE cross-connection between client 3 and client 2 or client 4.

Because each of two adjacent FlexE cross-connection rings has a ring-shaped protection path, after a fault occurs on a working path, a common node (for example, node 1) that carries the working path may forward service data through the protection paths of the two FlexE cross-connection rings. For a FlexE cross-connection ring in the conventional technology, only an E2E working path and an E2E protection path exist between a sending node and a receiving node. Generally, to prevent a fault of a link group from causing faults on both the working path and the protection path, a node that carries the E2E working path does not carry the E2E protection path. If a fault occurs in the working path carried by the common node, the node that carries the working path cannot forward service data by using the protection path. Therefore, the FlexE cross-connection ring and an automatic protection switching method based on the FlexE cross-connection ring that are provided in this application improve reliability of the FlexE cross-connection ring.

Figure 7:
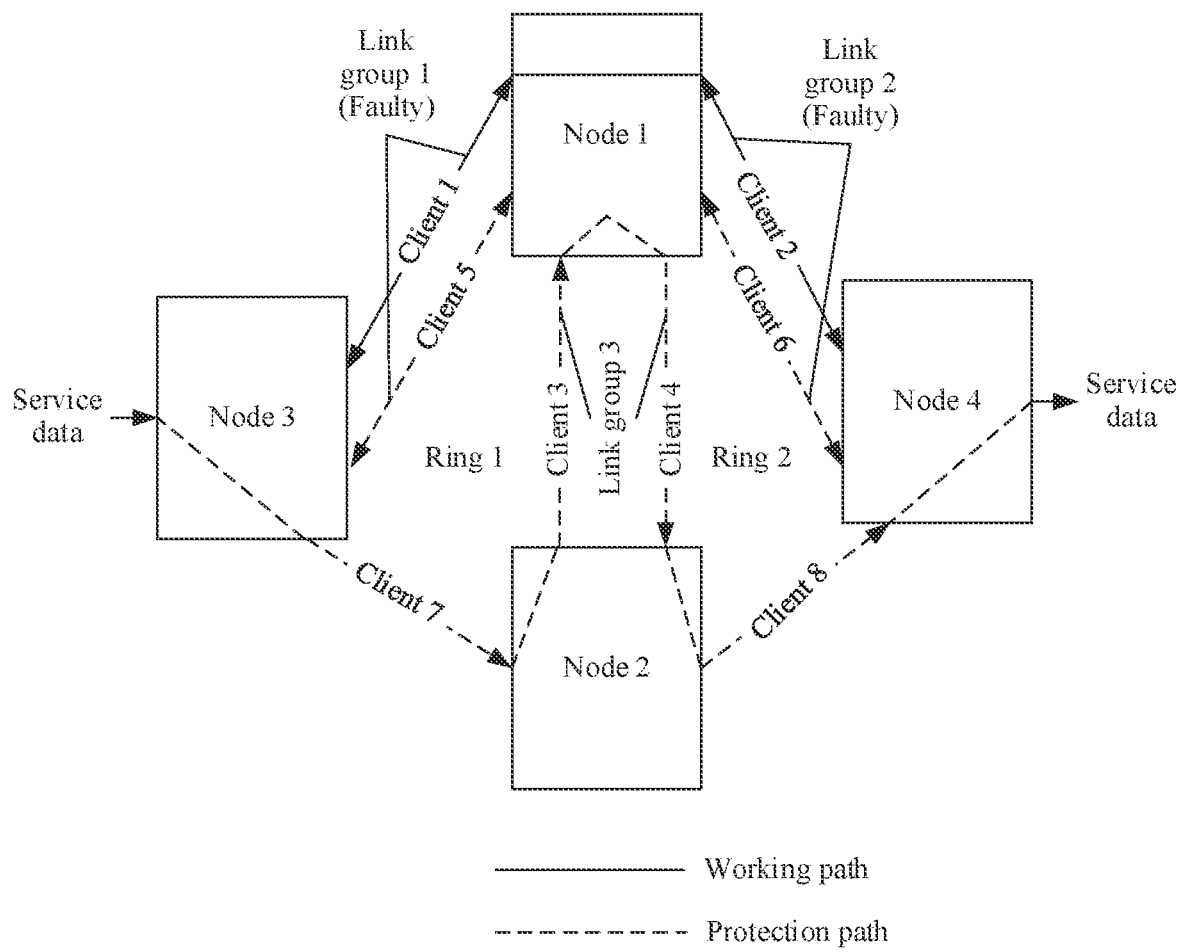
FIG. 7 is a schematic diagram of a data forwarding method of a first-type FlexE cross-connection ring in a first faulty state according to this application.

FIG. 7 shows an implementation of the method 600. When a fault occurs in link group 2, node 1 may perform the following steps to forward data:

deleting a FlexE cross-connection between client 4 and client 6;

deleting a FlexE cross-connection between client 3 and client 5; and establishing a FlexE cross-connection between client 3 and client 4.

Because a fault occurs in link group 2 as well, node 1 needs to forward service data by using a protection path of ring 2. After the service data is added to the ring from node 3, the service data is transmitted to node 2 by using client 7. Node 2 transmits the service data to node 1 based on a FlexE cross-connection between client 7 and client 3 by using client 3, node 1 transmits the service data to node 2 based on the FlexE cross-connection between client 3 and client 4, and node 2 transmits service data to node 4 based on a FlexE cross-connection between client 4 and client 8. Client 8 is a ring client for dropping data of node 4 when ring 2 is abnormal. After receiving the service data by using client 8, node 4 forwards the service data by using a UNI interface. In this way, the service data is forwarded.

FIG. 7 is merely an example for description. The service data may also be added to the ring from node 4, transmitted through a transmission path "client 8→client 4→client 3→client 7" and dropped at node 3.

If the fault in link group 1 is rectified, and the fault in link group 2 still exists, node 1 may perform the following steps to send the service data:

deleting the FlexE cross-connection between client 3 and client 4;

deleting a FlexE cross-connection between client 1 and client 2; and establishing a FlexE cross-connection between client 1 and client 4.

Figure 8:
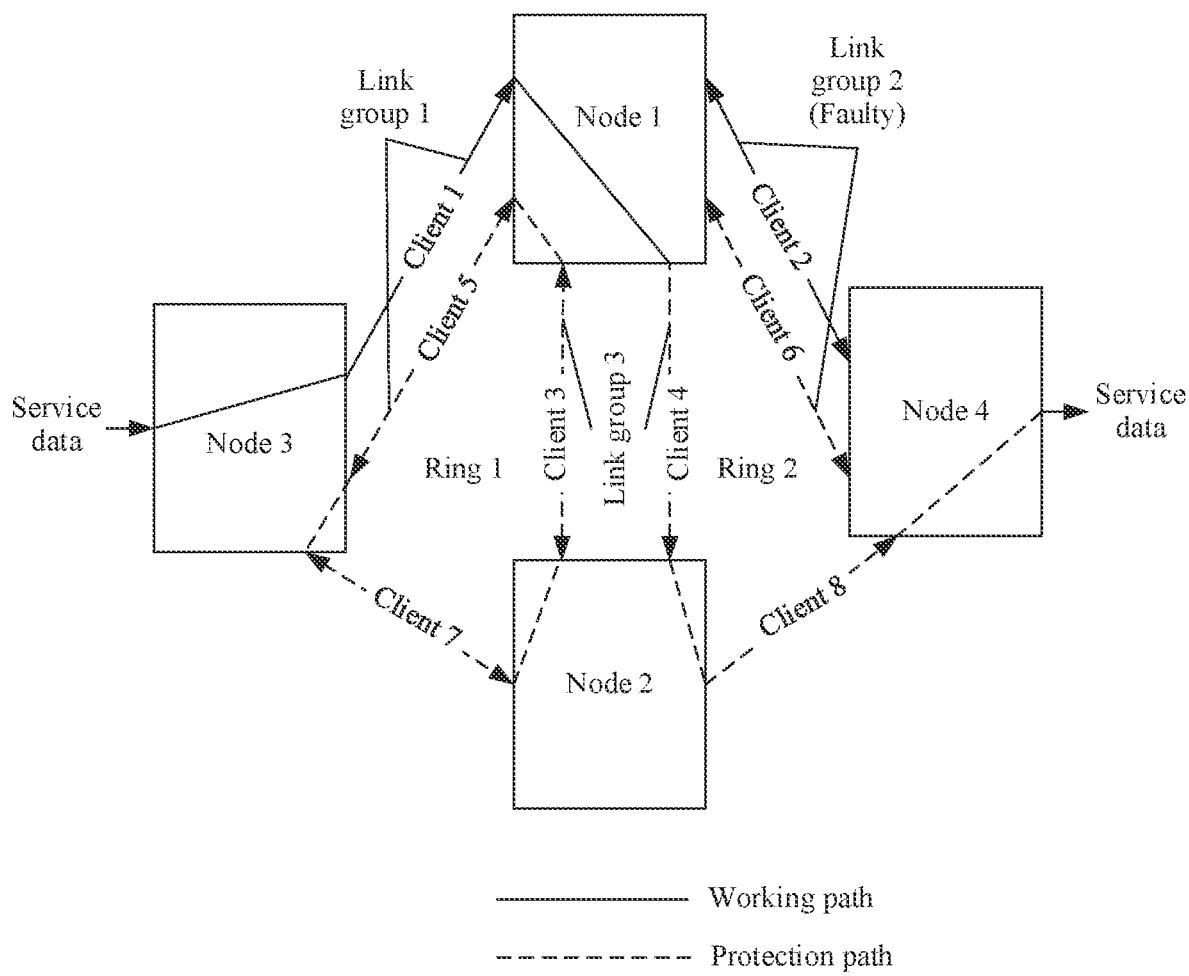
FIG. 8 is a schematic diagram of a data forwarding method of a first-type FlexE cross-connection ring in a second faulty state according to this application.

The service data is transmitted through a transmission path "client 1→client 4→client 8" and dropped at node 4, and the transmission path is shown in FIG. 8.

FIG. 8 is merely an example for description. The service data may also be added to the ring from node 4, transmitted through a transmission path "client 8→client 4→client 1" and dropped at node 3.

If the fault in link group 1 and the fault in link group 2 are rectified, node 1 may perform the following steps to send the service data:

establishing a FlexE cross-connection between client 1 and client 2.

The service data is transmitted through a transmission path "client 1→client 2" and dropped at node 4, and the transmission path is shown in FIG. 5.

A working path is usually a preferred transmission path between nodes. After the link fault in link group 1 is rectified, a node in the FlexE cross-connection ring may preferentially choose a working path to transmit the service data, so that a preferred transmission resource can be provided for the service data.

Figure 9:
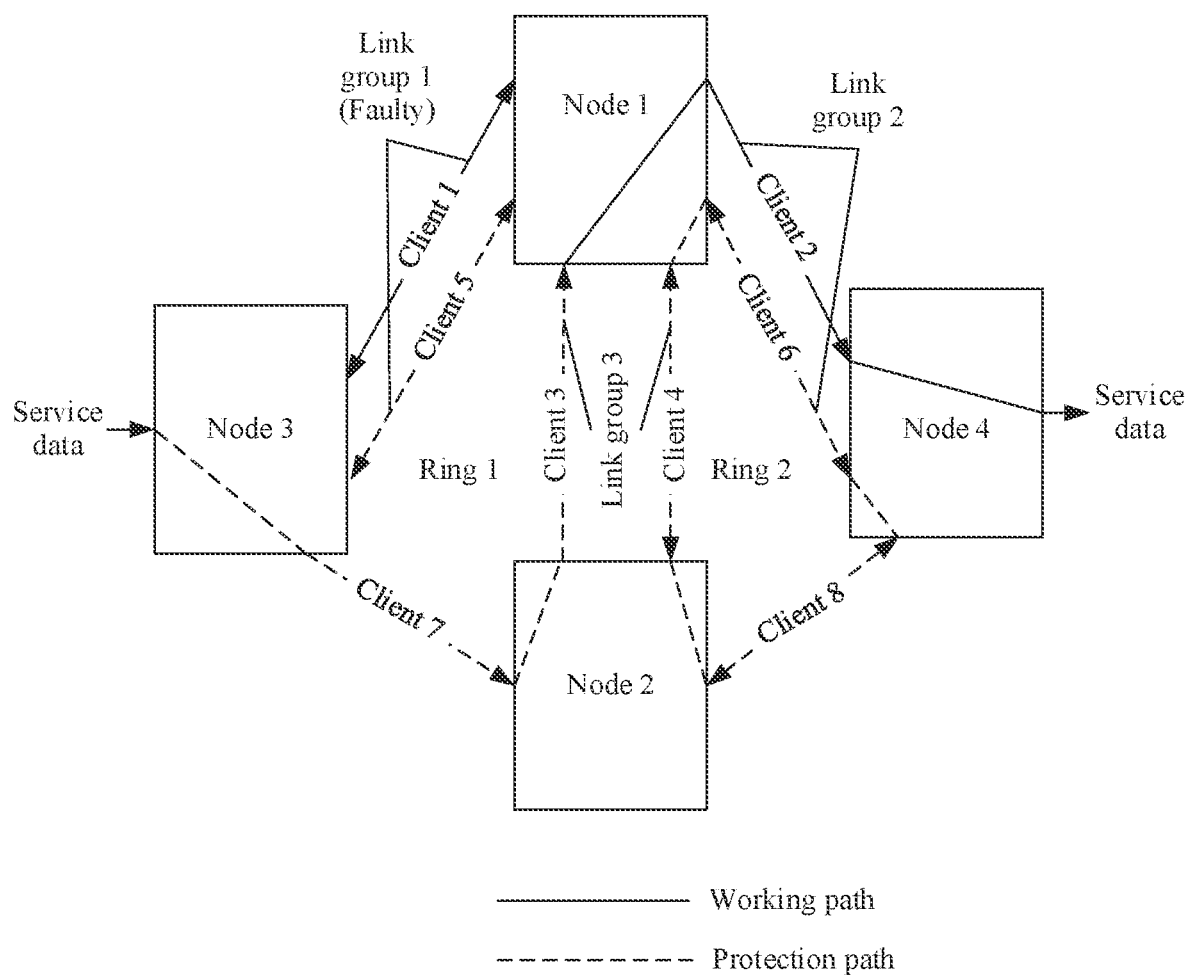
FIG. 9 is a schematic diagram of a data forwarding method of a first-type FlexE cross-connection ring in a third faulty state according to this application.

FIG. 9 shows an implementation of the method 600. When there is no fault in link group 2, node 1 may perform the following steps to forward data:

deleting a FlexE cross-connection between client 1 and client 2; and establishing a FlexE cross-connection between client 3 and client 2.

For a receive-end node (for example, node 4), a ring client for dropping data is a pre-configured client (for example, client 2), and the ring client for dropping data does not change when a fault occurs in a FlexE cross-connection ring (for example, ring 1) in which a sending-end node is located. Therefore, when ring 2 works properly, node 1 needs to establish the FlexE cross-connection between client 3 and client 2, so that node 4 drops the service data by using client 2.

The service data may also be added to the ring from node 4, transmitted through a transmission path "client 2→client 3→client 7" and dropped at node 3.

If the fault in link group 1 is rectified, node 1 may perform the following steps to send service data:

deleting the FlexE cross-connection between client 3 and client 2; and establishing a FlexE cross-connection between client 1 and client 2.

The service data is transmitted through a transmission path "client 1→client 2" and dropped at node 4, and the transmission path is shown in FIG. 5.

A working path is usually a preferred transmission path between nodes. After the link fault in link group 1 is rectified, a node in the FlexE cross-connection ring may preferentially choose a working path to transmit the service data, so that a preferred transmission resource can be provided for the service data.

The solutions described in FIG. 4 to FIG. 9 are merely examples for description. A FlexE cross-connection ring applicable to this application may further include more nodes.

Figure 10:
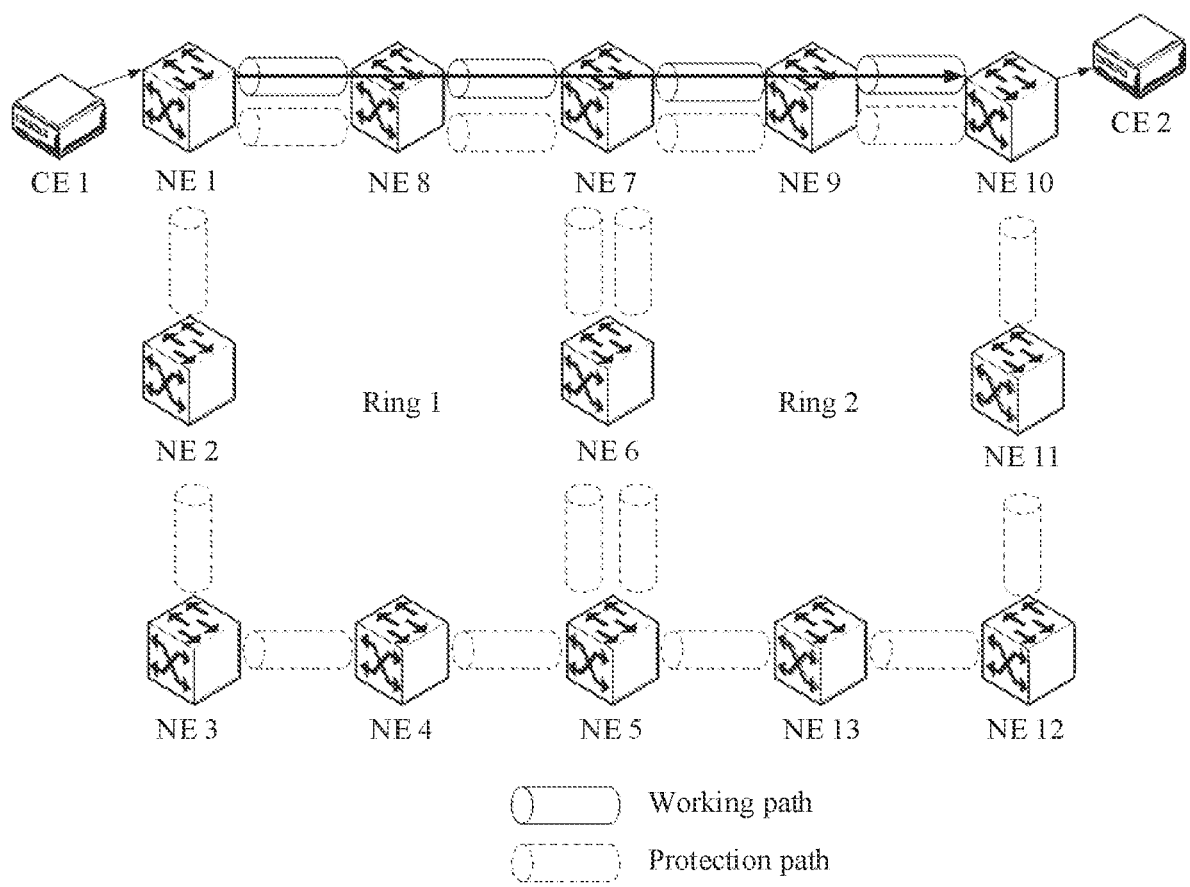
FIG. 10 is a schematic diagram of a data forwarding method of a second-type FlexE cross-connection ring in a normal state according to this application.

FIG. 10 is a schematic diagram of another type of FlexE cross-connection ring according to this application.

Network element (NE) 1, NE 2, NE 3, NE 4, NE 5, NE 6, NE 7, and NE 8 form a FlexE cross-connection ring (namely, ring 1). NE 1 is connected to customer equipment (CE) 1 as a PE device. NE 5, NE 6, NE 7, NE 9, NE 10, NE 11, NE 12, and NE 13 form another FlexE cross-connection ring (namely, ring 2). NE 10 is connected to CE 2 as a PE device. The foregoing NEs each may also be referred to as a node or a network device.

When each path on ring 1 and ring 2 is in a normal state, service data sent by CE 1 can be added to the ring by NE 1, transmitted through a transmission path "NE 1→NE 8→NE 7→NE 9→NE 10" and dropped at NE 4.

If a fault occurs in a FlexE link group between NE 7 and NE 8, related nodes on ring 1 and ring 2 may forward the service data according to the following method.

After determining that a fault occurs in the FlexE link group between NE 7 and NE 8, NE 8 may delete a FlexE cross-connection between two working clients of NE 8, and establish a FlexE cross-connection between a working client and a protection client of NE 8. The service data is transmitted to NE 1 through a protection path between NE 8 and NE 1. Then, the service data is transmitted to NE 7 through a protection path on ring 1 in a counterclockwise direction.

After determining that a fault occurs in the FlexE link group between NE 7 and NE 8, NE 7 may delete a FlexE cross-connection between a protection client of NE 7 and the protection client of NE 8, and establish a FlexE cross-connection between a protection client of ring 1 and a working client of ring 2. The service data is transmitted to NE 9 through a working path of ring 2, and NE 9 transmits, based on the working path of ring 2, the service data to NE 10 for dropping.

Figure 11:
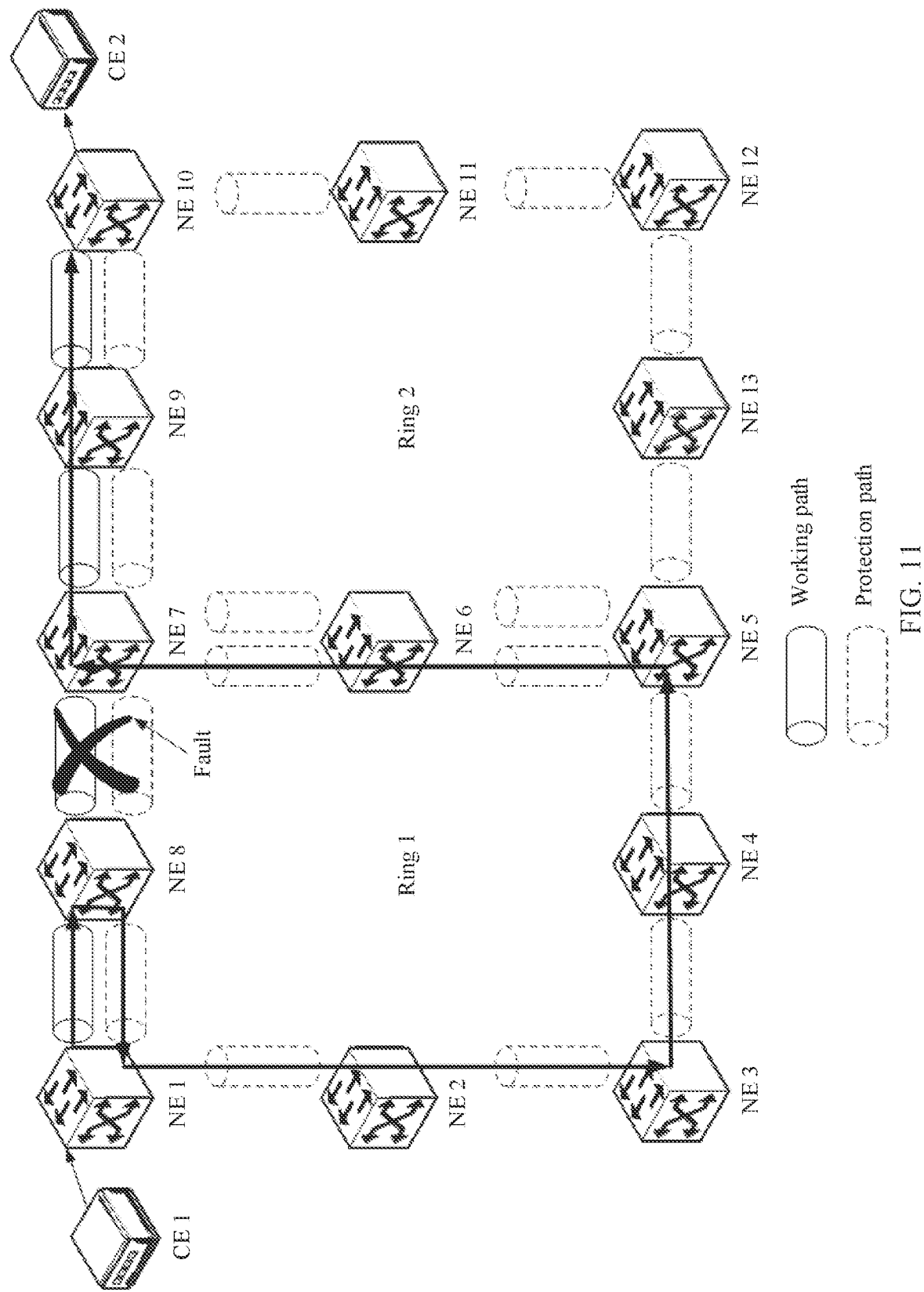
FIG. 11 is a schematic diagram of a data forwarding method of a second-type FlexE cross-connection ring in a first faulty state according to this application.

The service data is finally transmitted to NE 10 through the transmission path "NE 1→NE 2→NE 3→NE 4→NE 5→NE 6→NE 7→NE 9→NE 10" and dropped, as shown in FIG. 11.

The foregoing solution is merely an example for description. After the fault occurs in the FlexE link group between NE 7 and NE 8, NE 1 may directly send the service data to NE 2 by using a protection path, and does not send the service data to NE 8.

After the fault in the FlexE link group between NE 7 and NE 8 is rectified, ring 1 and ring 2 may forward the service data based on the transmission path shown in FIG. 10.

If a fault occurs in the FlexE link group between NE 7 and NE 8 and a fault occurs in a FlexE link group between NE 7 and NE 9, related nodes on ring 1 and ring 2 may forward the service data according to the following method.

After determining that a fault occurs in the FlexE link group between NE 7 and NE 8, NE 8 may delete a FlexE cross-connection between two working clients of NE 8, and establish a FlexE cross-connection between a working client and a protection client of NE 8. The service data is transmitted to NE 1 through a protection path between NE 8 and NE 1. Then, the service data is transmitted to NE 7 through a protection path on ring 1 in a counterclockwise direction.

After determining that a fault occurs in the FlexE link group between NE 7 and NE 8 and a fault occurs in the FlexE link group between NE 7 and NE 9, NE 7 may delete a FlexE cross-connection between a protection client of NE 8 and the protection client of NE 7 and a FlexE cross-connection between the protection client of NE 7 and a protection client of NE 9, and establish a FlexE cross-connection between a protection client of ring 1 and a protection client of ring 2. The service data is transmitted to NE 6 through the protection path of ring 2, and NE 6 transmits, based on the protection path of ring 2, the service data to NE 10 for dropping.

Figure 12:
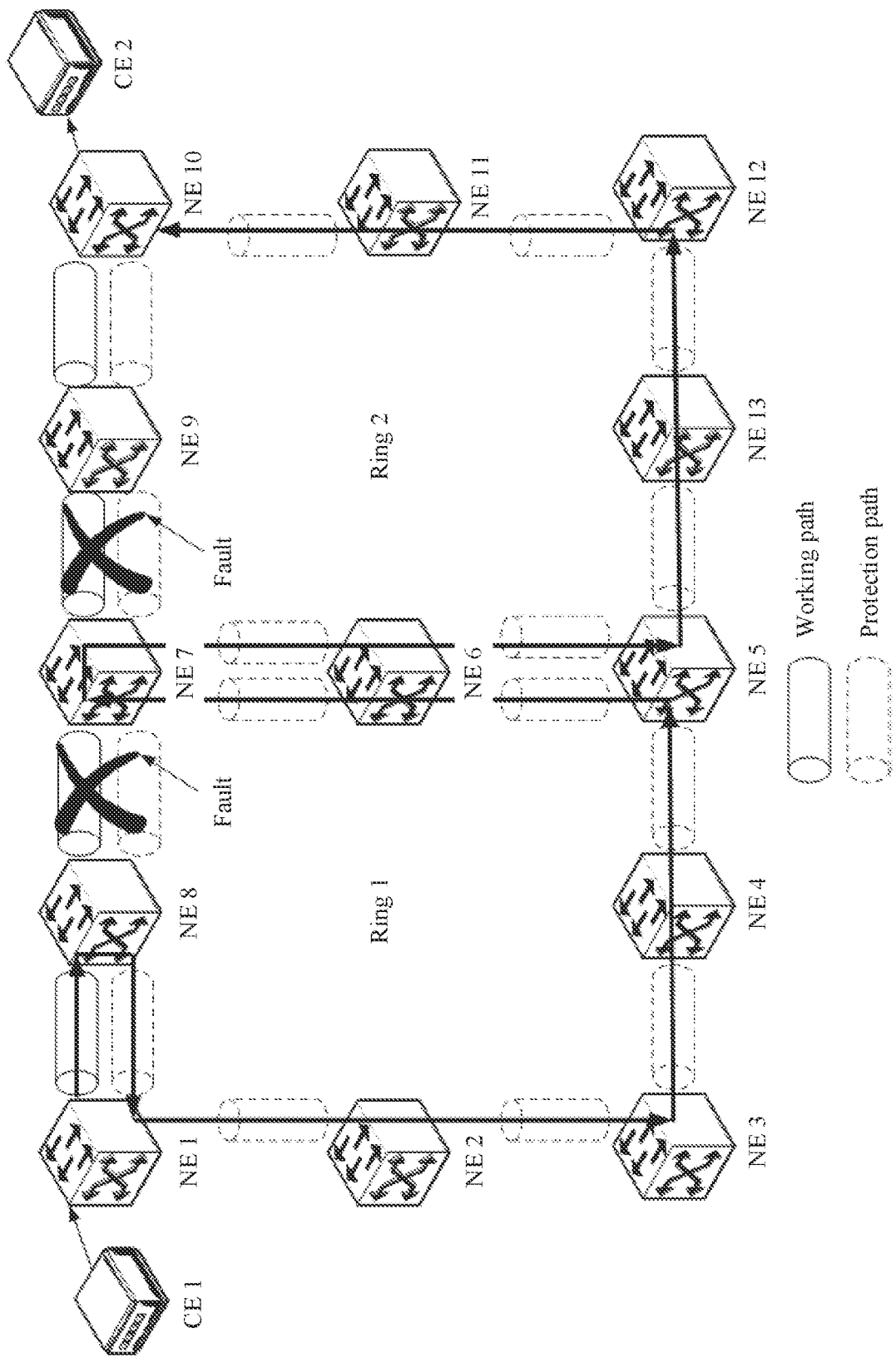
FIG. 12 is a schematic diagram of a data forwarding method of a second-type FlexE cross-connection ring in a second faulty state according to this application.

The service data is finally transmitted to NE 10 through the transmission path "NE 1→NE 2→NE 3→NE 4→NE 5→NE 6→NE 7→NE 6→NE 5→NE 13→NE 12→NE 11→NE 10" and dropped, as shown in FIG. 12.

The foregoing solution is merely an example for description. After the fault occurs in the FlexE link group between NE 7 and NE 8, NE 1 may directly send the service data to NE 2 by using a protection path, and does not send the service data to NE 8.

Figure 13:
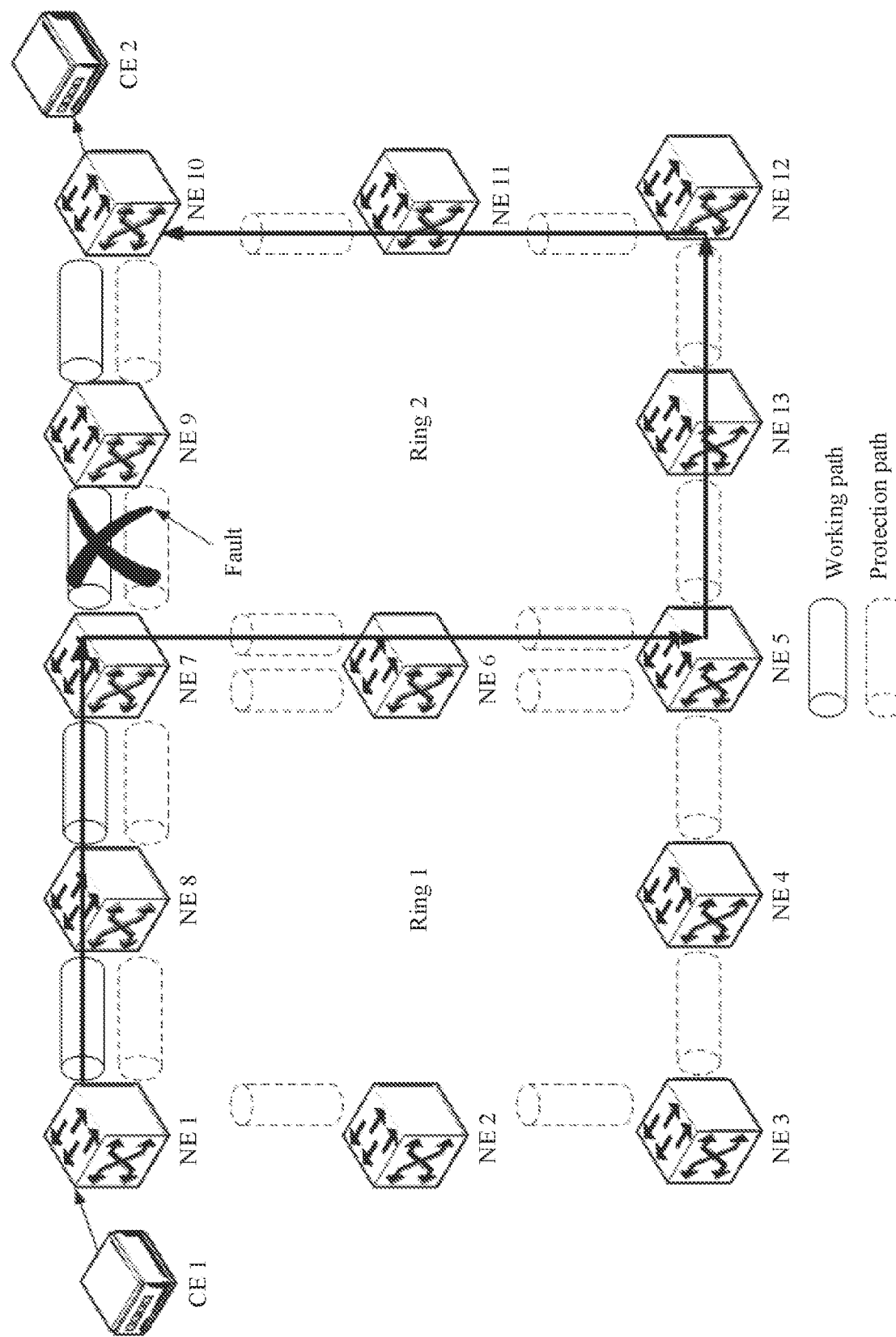
FIG. 13 is a schematic diagram of a data forwarding method of a second-type FlexE cross-connection ring in a third faulty state according to this application.

After the fault in the FlexE link group between NE 7 and NE 8 is rectified, ring 1 and ring 2 may forward the service data based on the transmission path shown in FIG. 13.

After the fault in the FlexE link group between NE 7 and NE 8 and the fault in the FlexE link group between NE 7 and NE 9 are rectified, ring 1 and ring 2 may forward the service data based on the transmission path shown in FIG. 10.

It should be understood that the FlexE cross-connection ring shown in FIG. 10 to FIG. 13 is merely an example for description, and an application scenario of the FlexE cross-connection ring provided in this application is not limited to the scenarios shown in FIG. 10 to FIG. 13.

For example, the FlexE cross-connection ring shown in FIG. 10 may be further used in a 4th generation (4G) mobile communications system, where CE 1 may be directly or indirectly connected to a base station (eNB) in the 4G mobile communications system. The FlexE cross-connection ring shown in FIG. 10 may be further applied to a 5th generation ($5^{th}$ generation, 5G) mobile communications system. CE 1 may be directly or indirectly connected to a base station (gNB) in the 5G mobile communications system.

For another example, the FlexE cross-connection ring shown in FIG. 10 may alternatively be in a multi-layer network architecture. NE 1 may be connected to an access layer device, and NE 10 may be connected to a convergence layer device or a core layer device.

The foregoing examples are merely examples for description, and the FlexE cross-connection ring provided in this application is also applicable to a future communications system.

The foregoing solutions are data forwarding solutions used when a common node (for example, node 1 in FIG. 4) that carries a working path works properly. If a fault occurs in the common node that carries the working path, a common node (for example, node 2 in FIG. 4) that only carries a protection path is needed to establish a FlexE cross-connection between two rings.

Figure 14:
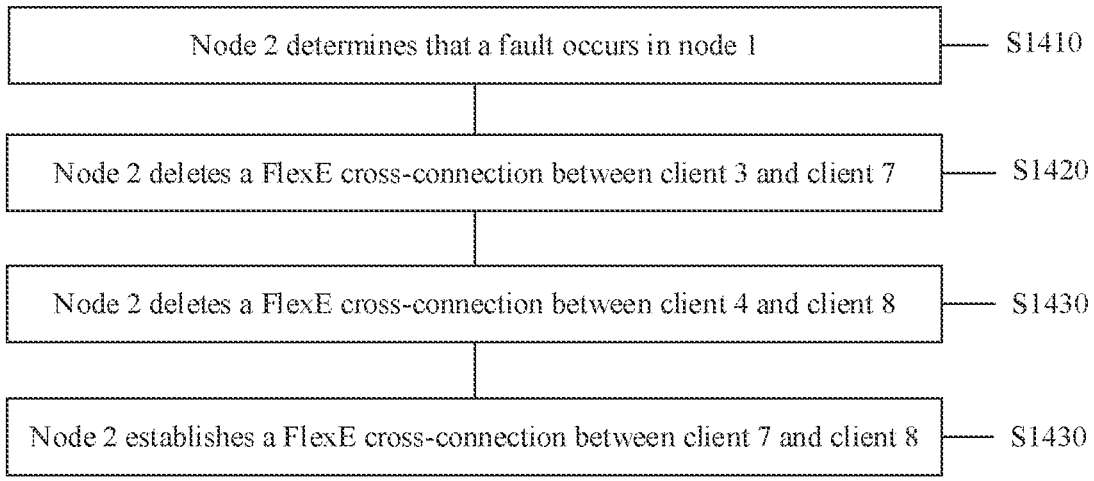
FIG. 14 is a schematic diagram of another communication method according to this application.

FIG. 14 shows another communication method applied to a FlexE cross-connection ring according to this application. The method 1400 may be performed by node 2 in FIG. 4. The method 1400 includes:

S1410. Node 2 determines that a fault occurs in node 1.

S1420. Node 2 deletes a FlexE cross-connection between client 3 and client 7.

S1430. Node 2 deletes a FlexE cross-connection between client 4 and client 8.

S1440. Node 2 establishes a FlexE cross-connection between client 7 and client 8.

Figure 15:
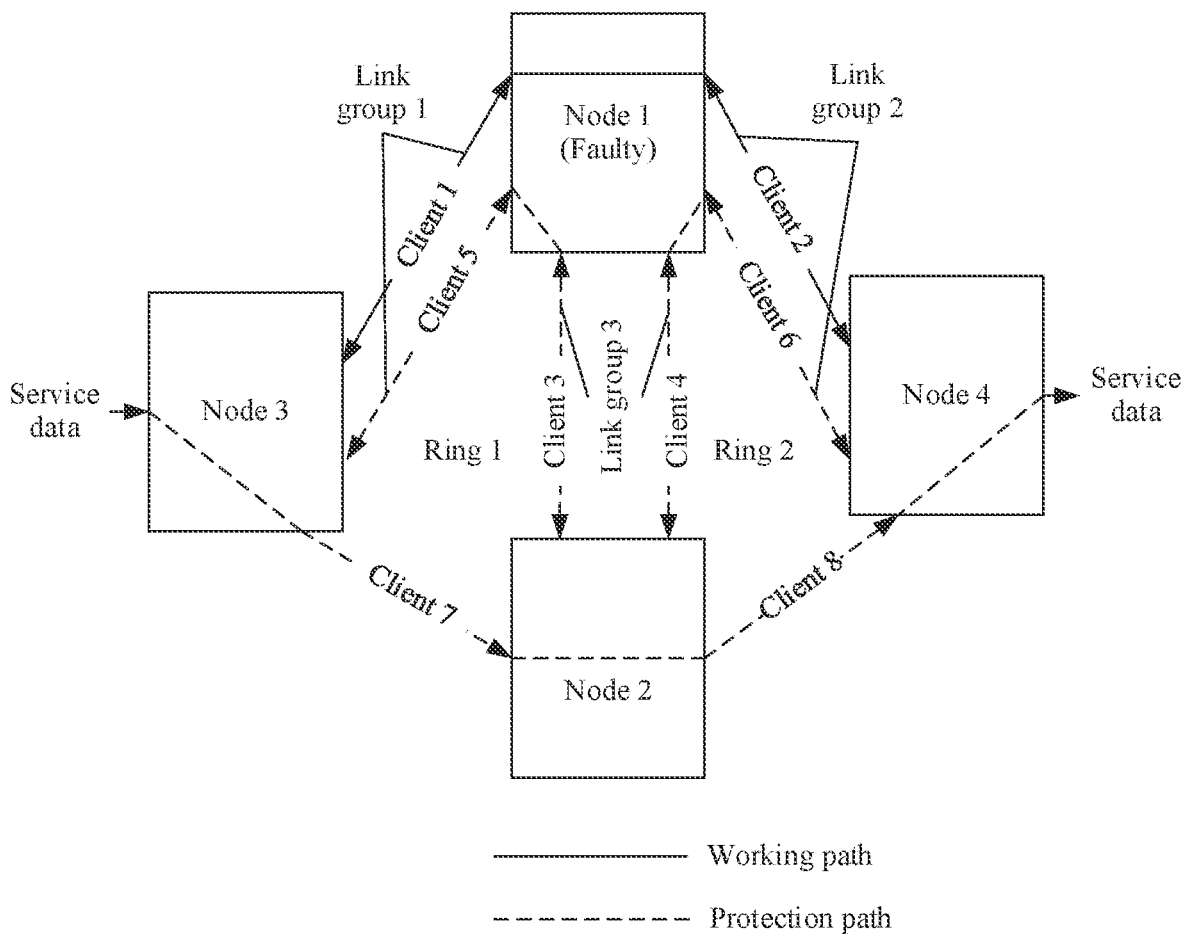
FIG. 15 is a schematic diagram of a data forwarding method of a first-type FlexE cross-connection ring in a fourth faulty state according to this application.

All nodes adjacent to node 1 may determine, based on an OAM function, that a fault occurs in node 1. After determining that a fault occurs in node 1, node 3 determines that client 7 is a ring client for adding data, deletes a FlexE cross-connection between client 7 and client 5, and forwards, by using client 7, service data that is added to the ring. After determining that a fault occurs in node 1, node 2 establishes a FlexE cross-connection between client 3 and client 4, and forwards, by using client 8, the service data received by using client 7. After determining that a fault occurs in node 1, node 4 determines client 8 to be a ring client for dropping data, deletes a FlexE cross-connection between client 8 and client 6, and drops the service data received by using client 8. The foregoing forwarding process is shown in FIG. 15.

Because node 2 carries protection paths of two FlexE cross-connection rings, when a fault occurs in a node (namely, node 1) carrying a working path, node 2 may establish a FlexE cross-connection between two protection clients, so that service data forwarding across FlexE cross-connection rings is completed, and reliability of a ring network formed by a plurality of FlexE cross-connection rings is enhanced.

After determining that the fault of node 1 is rectified, node 3 continues to send the service data through the working path carried by node 1, namely, the sending path shown in FIG. 5.

Figure 16:
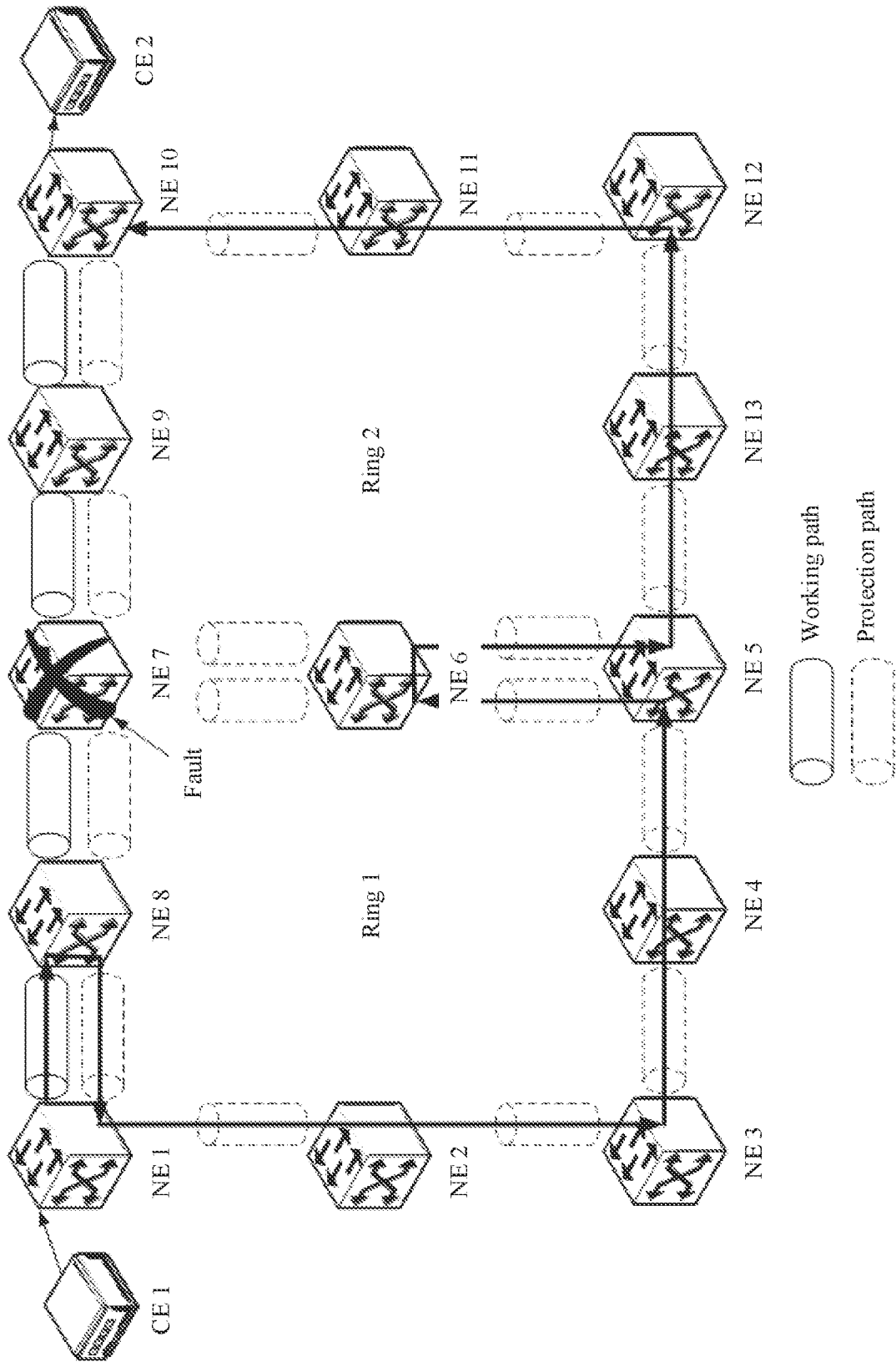
FIG. 16 is a schematic diagram of a data forwarding method of a second-type FlexE cross-connection ring in a fourth faulty state according to this application.

For the FlexE cross-connection ring shown in FIG. 10, if a fault occurs in NE 7, NE 8 and NE 6 may determine, based on an OAM function, that the fault occurs in NE 7, and perform corresponding processing on a forwarding path, as shown in FIG. 16.

NE 8 deletes a FlexE cross-connection between two working clients (a working client between NE 1 and NE 8 and a working client between NE 8 and NE 7), establishes a FlexE cross-connection between a working client (a working client between NE 1 and NE 8) and a protection client (a protection client between NE 1 and NE 8), and forwards a packet sent by NE 1 to NE 6 through a protection path on ring 1.

NE 6 deletes a FlexE cross-connection between two protection clients (a protection client between NE 5 and NE 6 and a protection client between NE 6 and NE 7), establishes a FlexE cross-connection between a protection client on ring 1 and a protection client on ring 2, and forwards the service data to NE 10 through a protection path on ring 2. NE 10 drops the service data, so that service data forwarding across FlexE cross-connection rings is completed when a fault occurs in NE 7, and reliability of a ring network formed by a plurality of FlexE cross-connection rings is enhanced.

Figure 18:
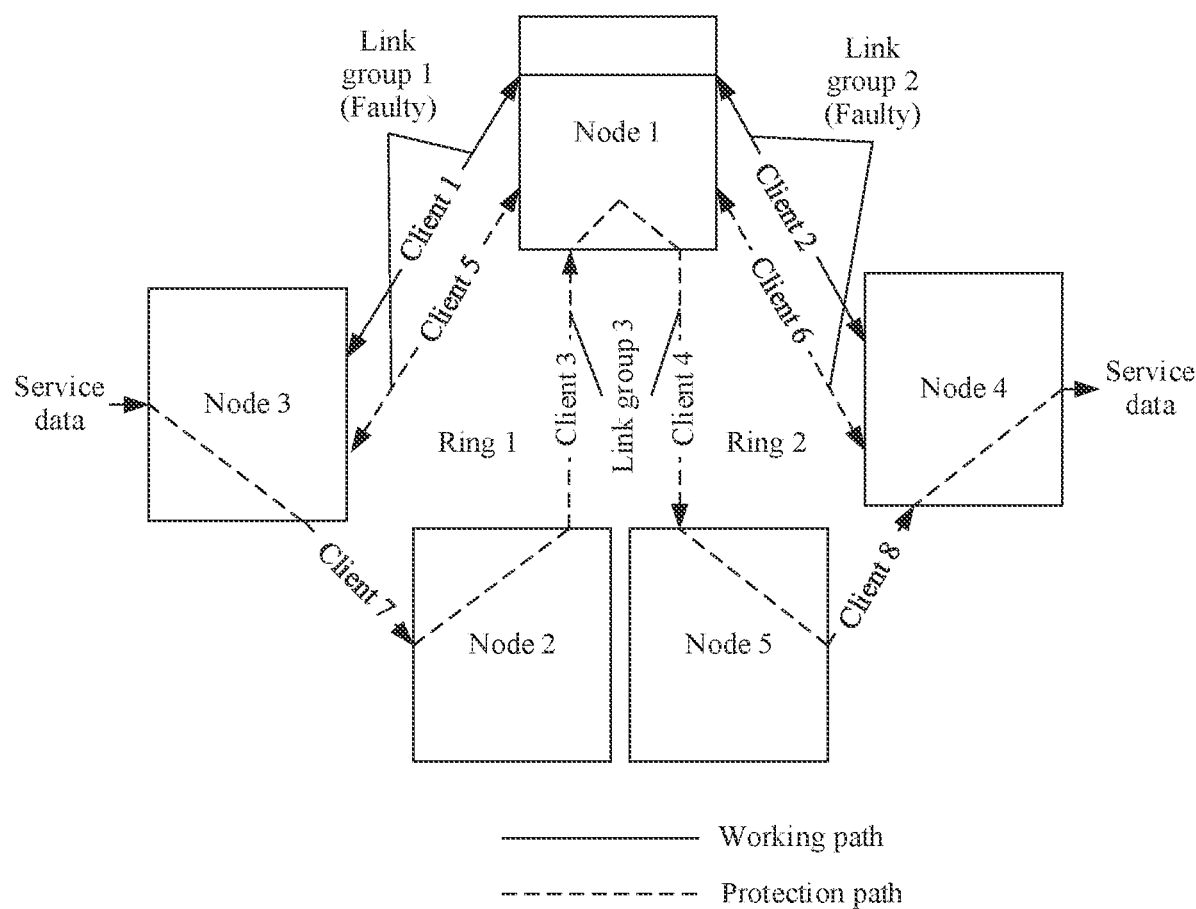
FIG. 18 is a schematic diagram of a data forwarding method of a third-type FlexE cross-connection ring in a first faulty state according to this application.
Figure 19:
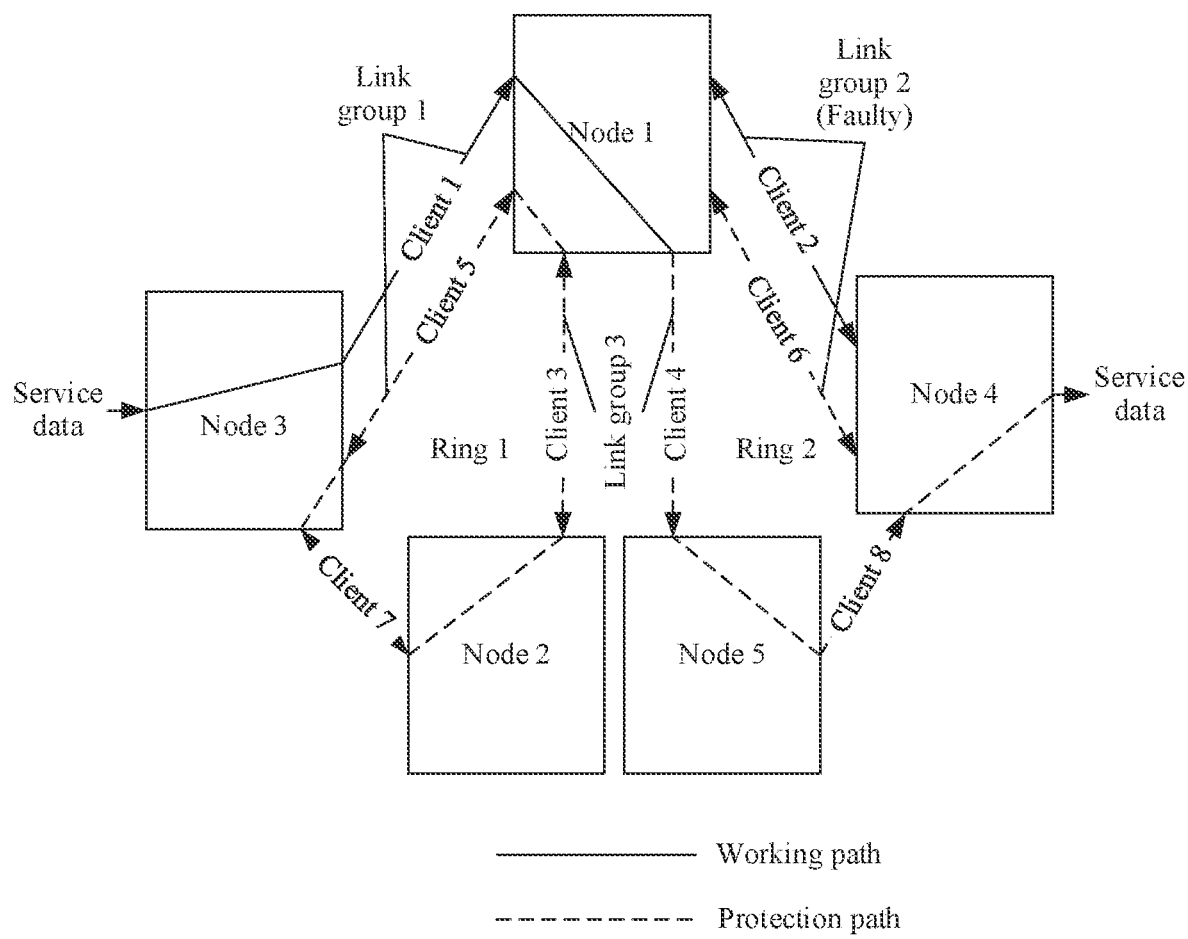
FIG. 19 is a schematic diagram of a data forwarding method of a third-type FlexE cross-connection ring in a second faulty state according to this application.
Figure 20:
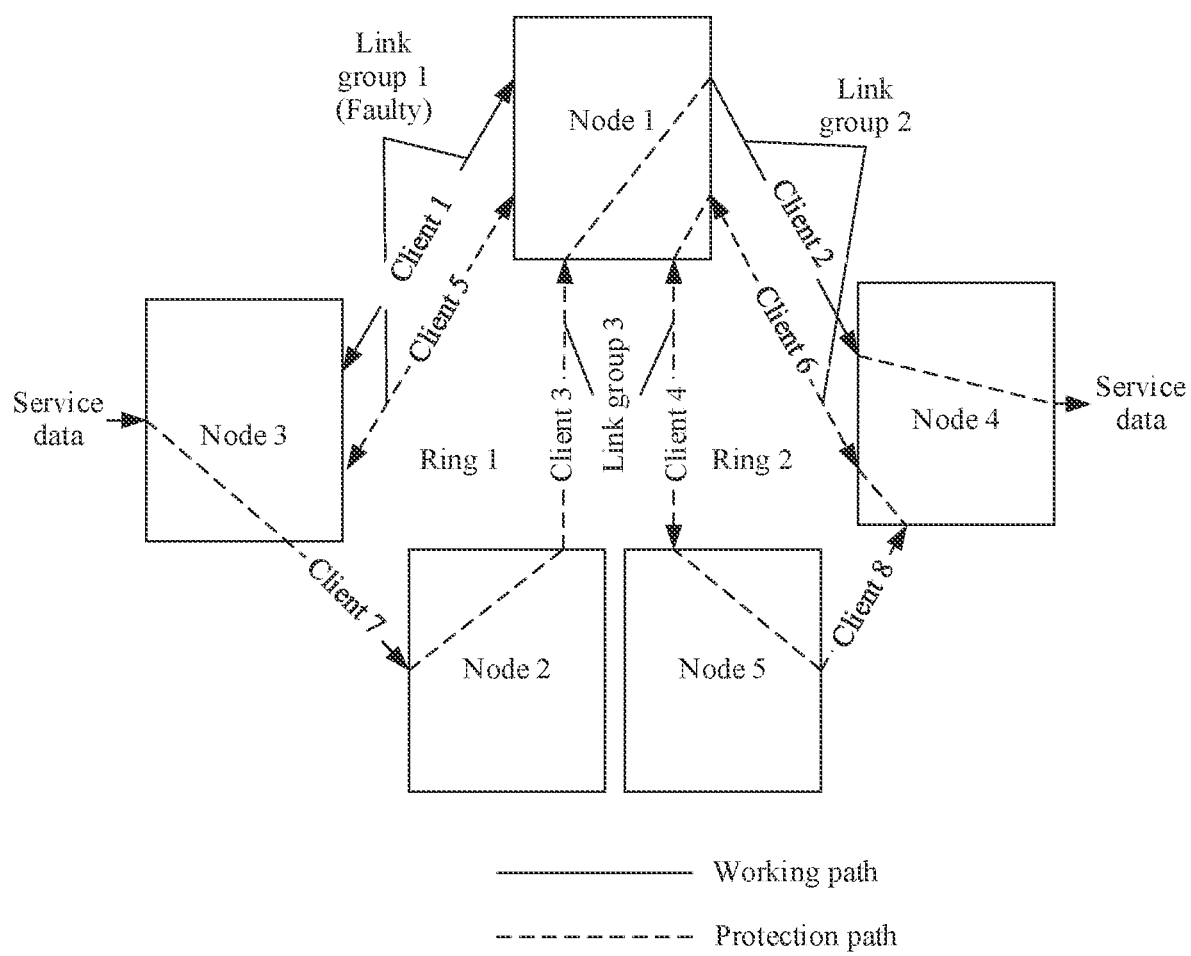
FIG. 20 is a schematic diagram of a data forwarding method of a third-type FlexE cross-connection ring in a third faulty state according to this application.

The foregoing describes a solution in which two adjacent FlexE cross-connection rings have at least two common nodes. For a ring network shown in FIG. 17, in which two adjacent FlexE cross-connection rings have only one common node, the method shown in FIG. 6 is still applicable. FIG. 18 to FIG. 20 show a processing method if a fault occurs in link group 1 and/or a fault occurs in link group 2. It can be known by comparing with FIG. 7 to FIG. 9 that whether protection paths on ring 1 and ring 2 are carried on a same node, the processing method is the same for node 1.

This application further provides a FlexE cross-connection ring. Each node in the FlexE cross-connection ring has a plurality of working paths and a plurality of protection paths, and the plurality of working paths are in a one-to-one correspondence with the plurality of protection paths.

Figure 21:
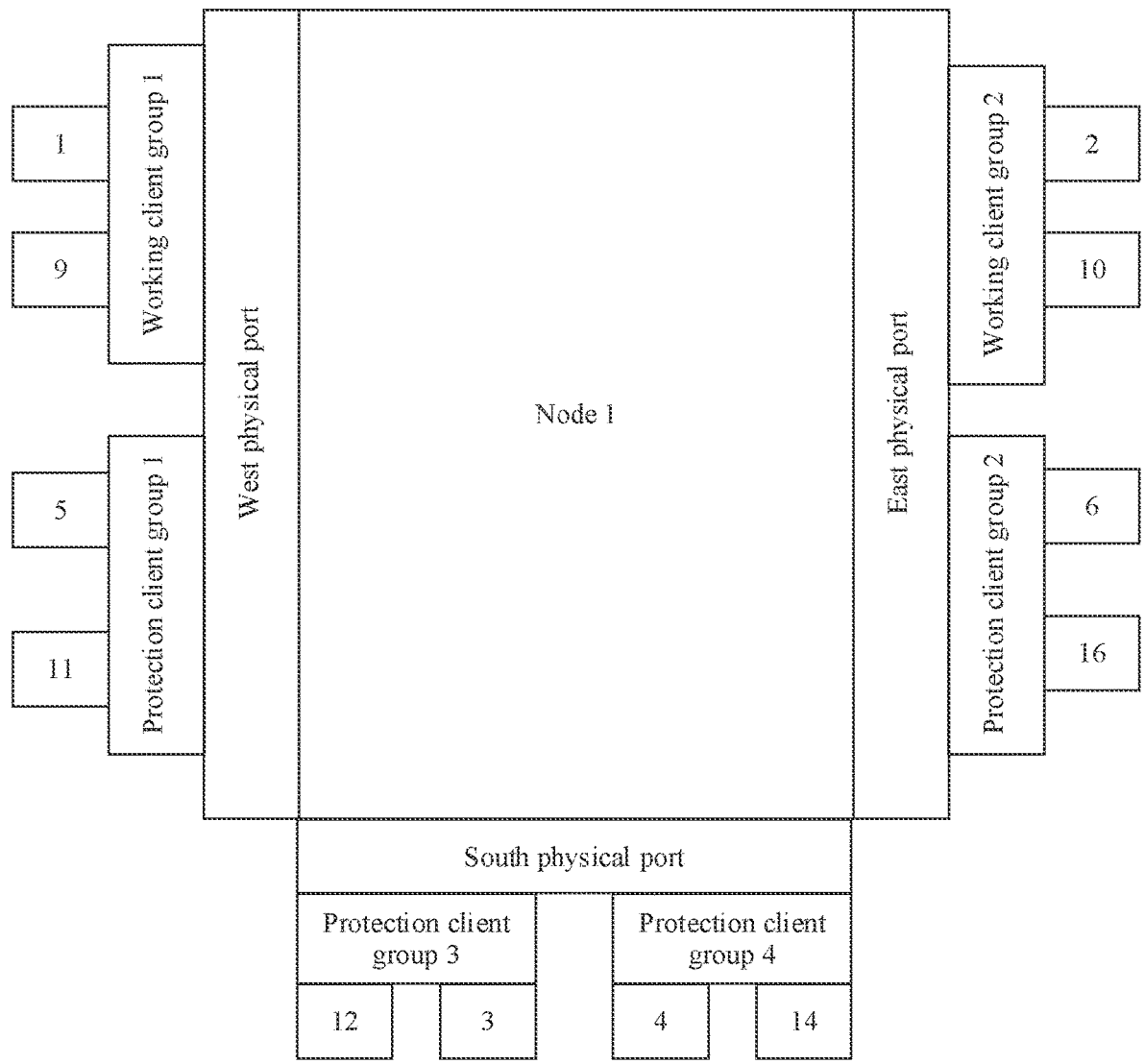
FIG. 21 is a schematic diagram of a node with a client group according to this application.

As shown in FIG. 21, node 1 includes three physical ports (namely, PHYs), an east physical port, a west physical port, and a south physical port. Node 1 shown in FIG. 21 is merely an example for description, and node 1 may further include more physical ports.

The east physical port corresponds to four clients: client 2, client 10, client 6, and client 16. Client 2 and client 10 are working clients (clients corresponding to working paths), and client 6 and client 16 are protection clients (clients corresponding to protection paths).

The west physical port corresponds to four clients: client 1, client 9, client 5, and client 11. Client 1 and client 9 are working clients, and client 5 and client 11 are protection clients.

The south physical port corresponds to four clients: client 12, client 3, client 4, and client 14. The four clients are all protection clients.

The two working clients of the east physical port are configured as one client group (client group), namely, working client group 1. The two working clients of the west physical port are configured as another client group, namely, working client group 2. In this application, the client group may also be referred to as a client binding group. The two protection clients of the east physical port are configured as one client group, namely, protection client group 1. The two protection clients of the west physical port are configured as another client group, namely, protection client group 2. The four protection clients of the south physical port are configured as two client groups, namely, protection client group 3 and protection client group 4.

The foregoing client groups are merely examples for description. A quantity of clients in the client group provided in this application may alternatively be another quantity. For example, three clients are one client group, or more clients are one client group.

Figure 22:
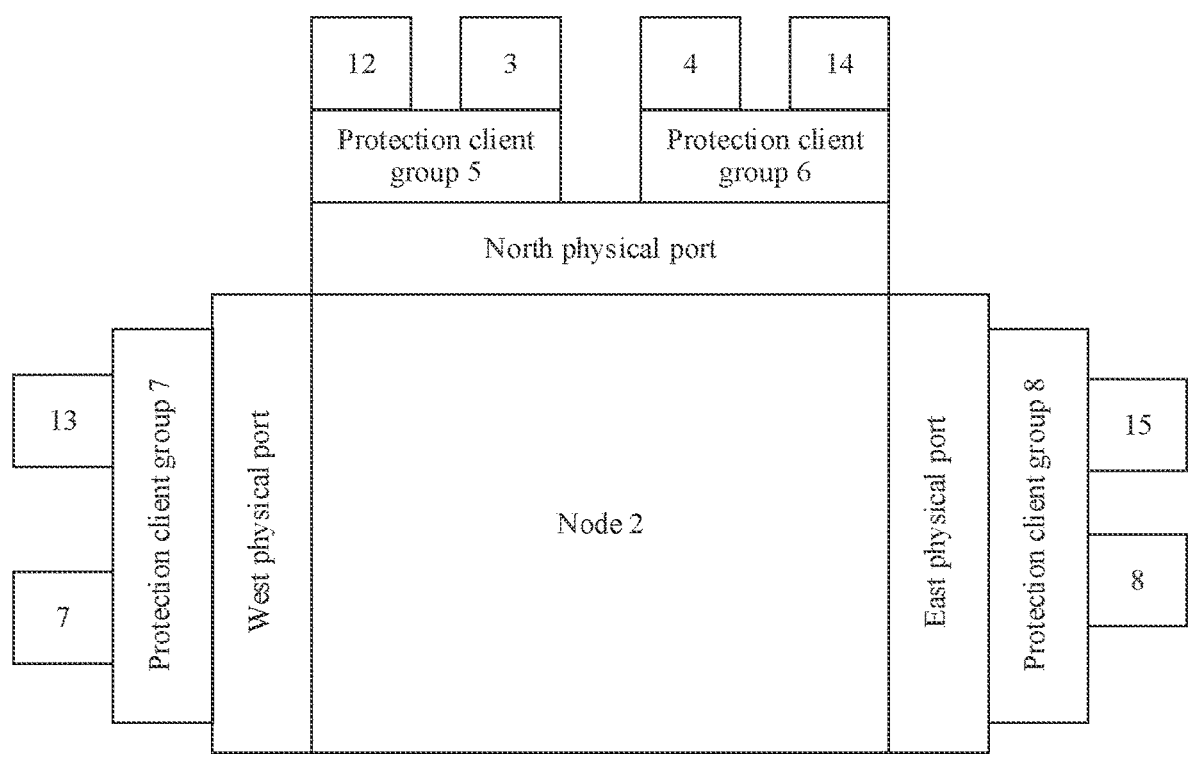
FIG. 22 is a schematic diagram of another node with a client group according to this application.
Figure 23:
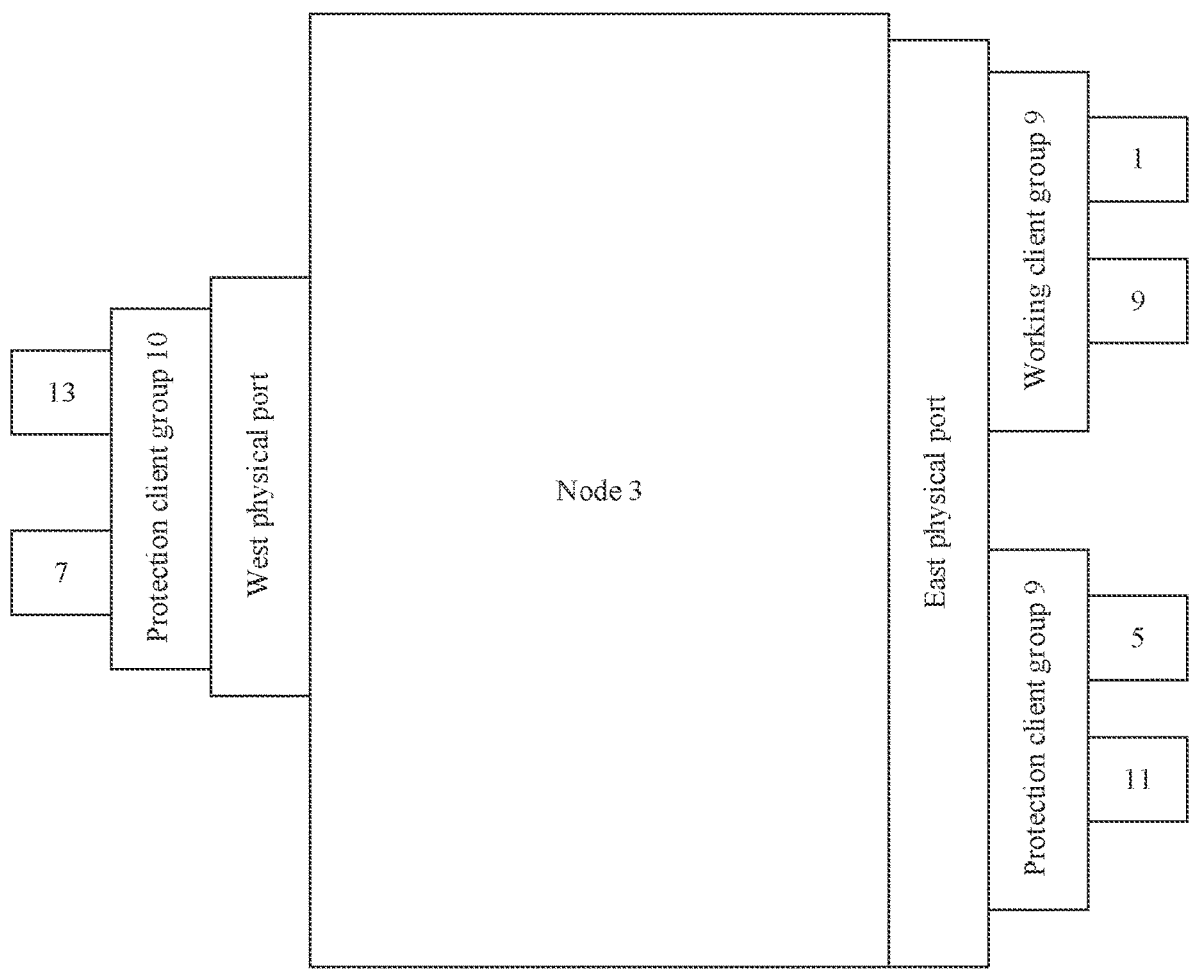
FIG. 23 is a schematic diagram of still another node with a client group according to this application.
Figure 24:
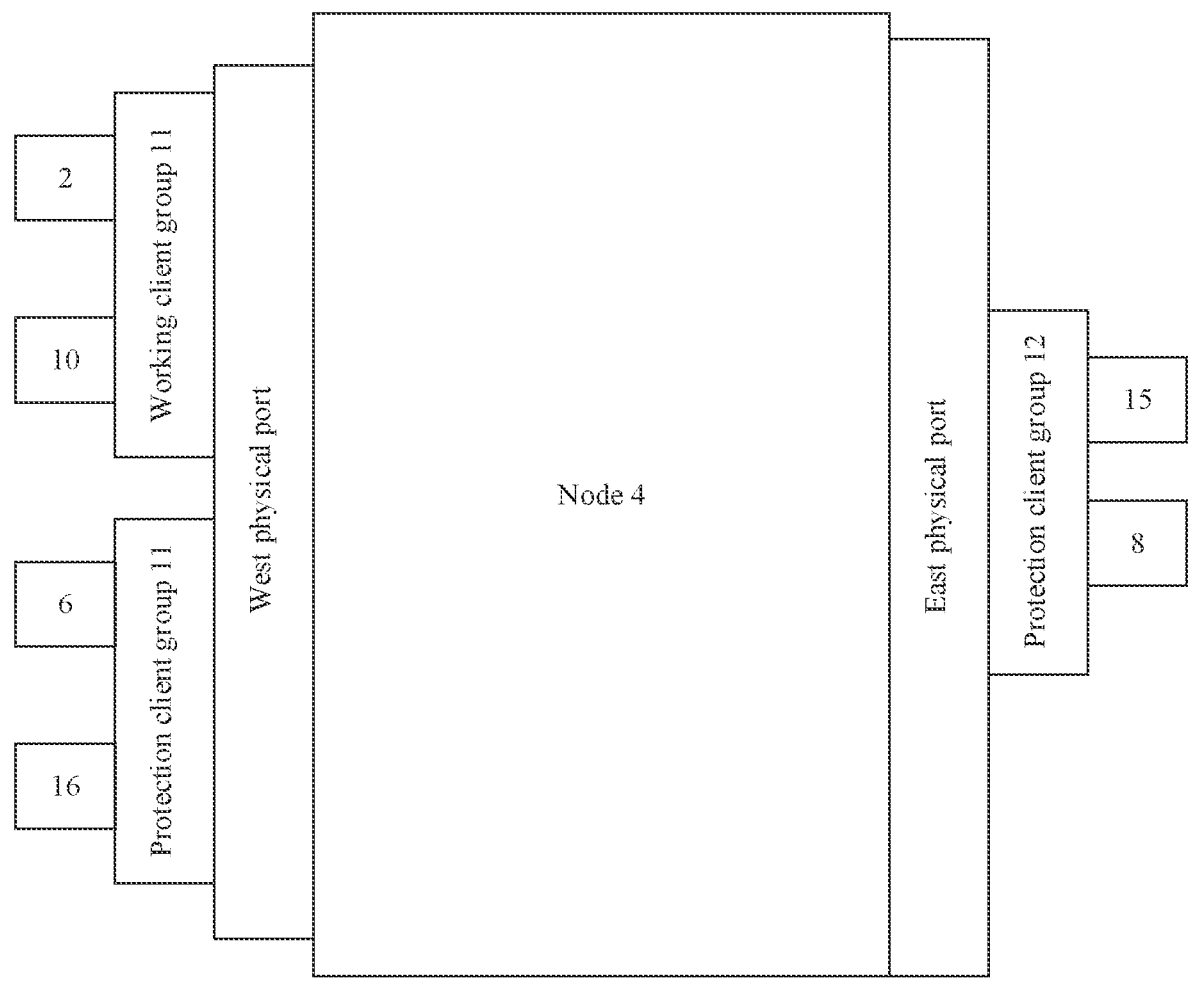
FIG. 24 is a schematic diagram of still another node with a client group according to this application.

Similarly, a working client group and a protection client group may also be configured for node 2, node 3, and node 4. FIG. 22 to FIG. 24 show configuration results.

Figure 25:
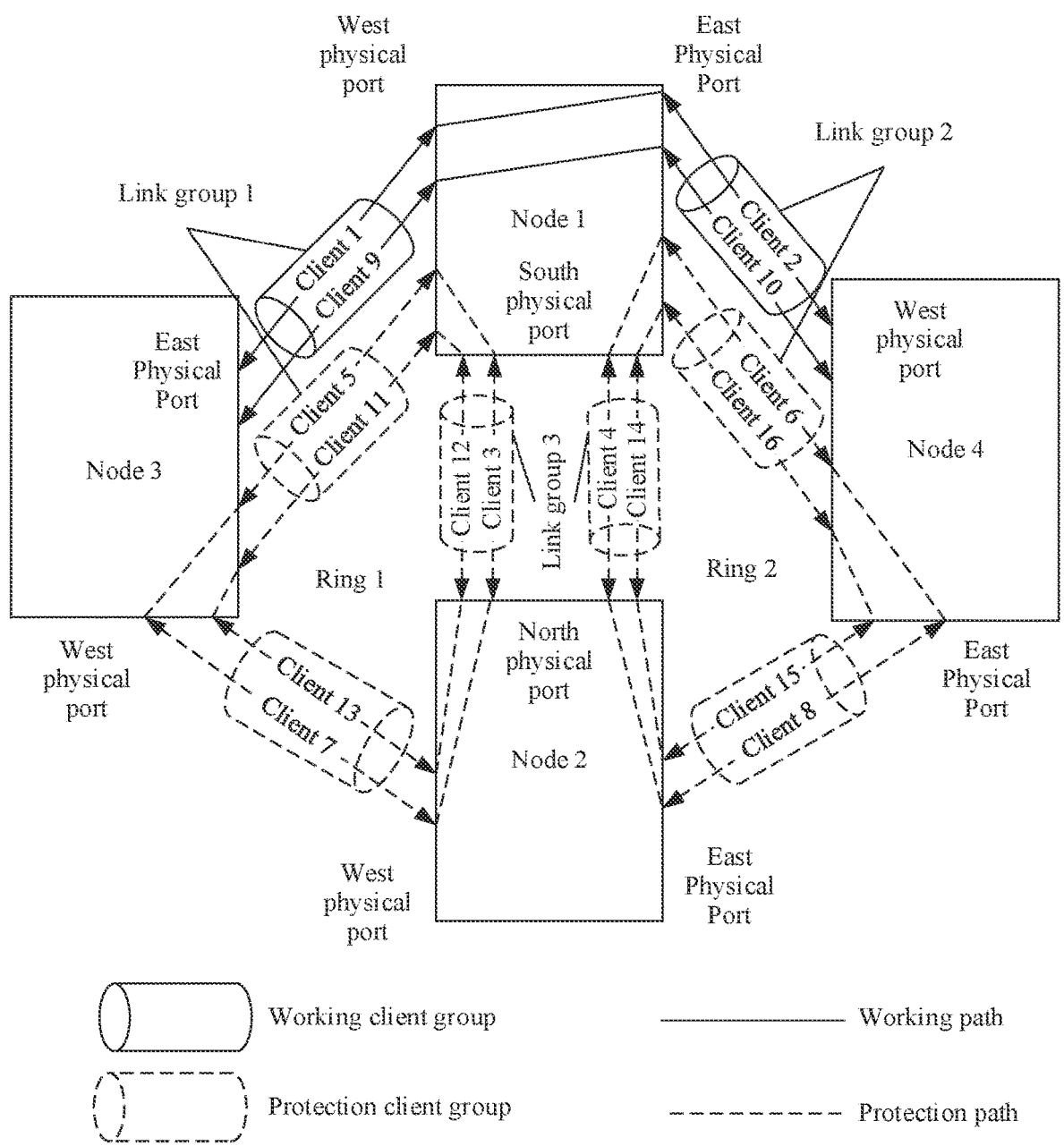
FIG. 25 is a schematic diagram of a fourth-type FlexE cross-connection ring according to this application.

A FlexE cross-connection ring including four nodes that are as shown in FIG. 21 to FIG. 24 is shown in FIG. 25.

Figure 26:
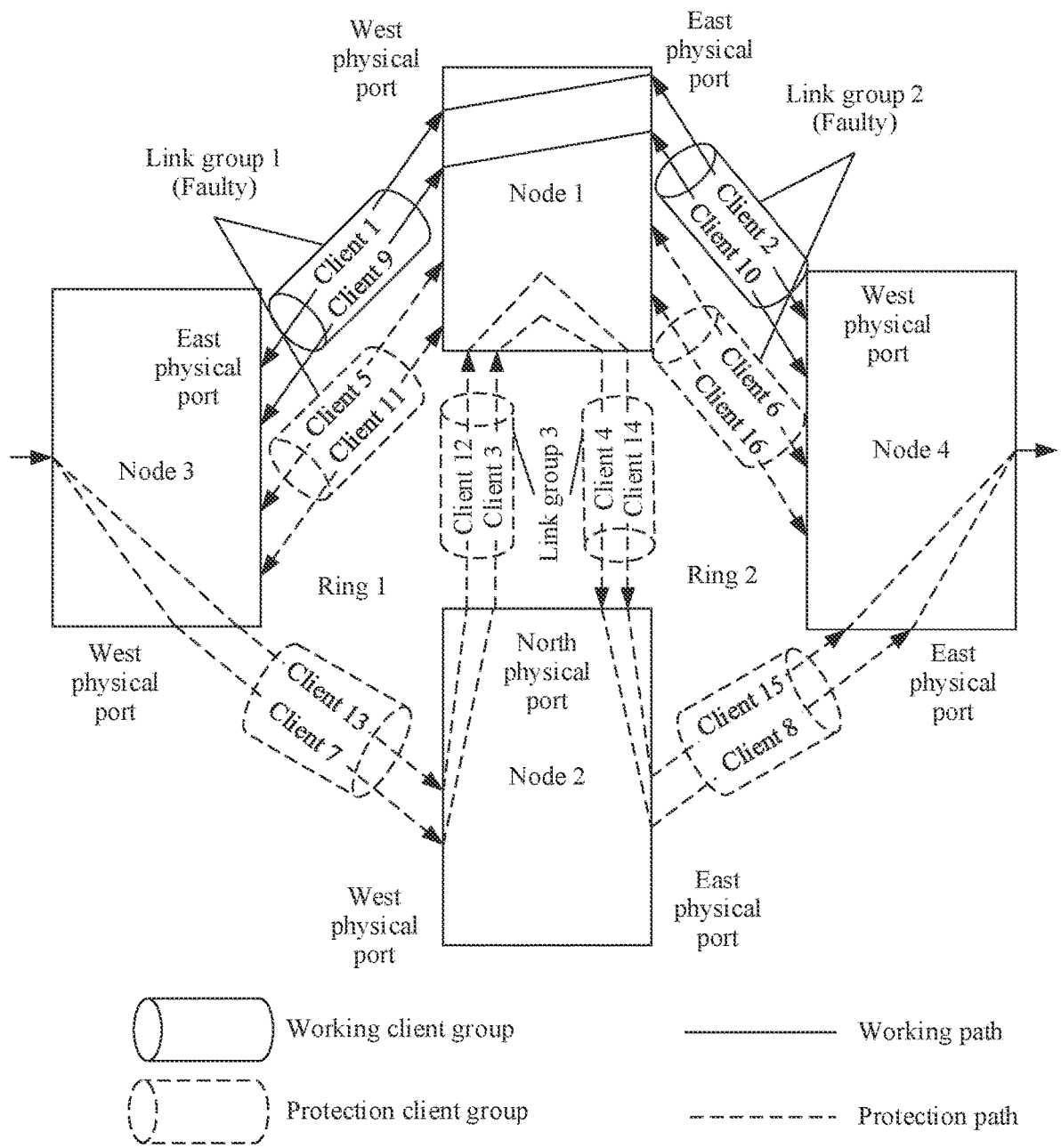
FIG. 26 is a schematic diagram of a data forwarding method of a fourth-type FlexE cross-connection ring in a first faulty state according to this application.

If a fault occurs in link group 1 and a fault occurs in link group 2, node 1 may delete a FlexE cross-connection between the working client group of the west physical port and the working client group of the east physical port, establish a FlexE cross-connection between two protection client groups of the south physical port, and sends out service data from the protection client group of the south physical port. FIG. 26 shows the foregoing transmission path.

Figure 27:
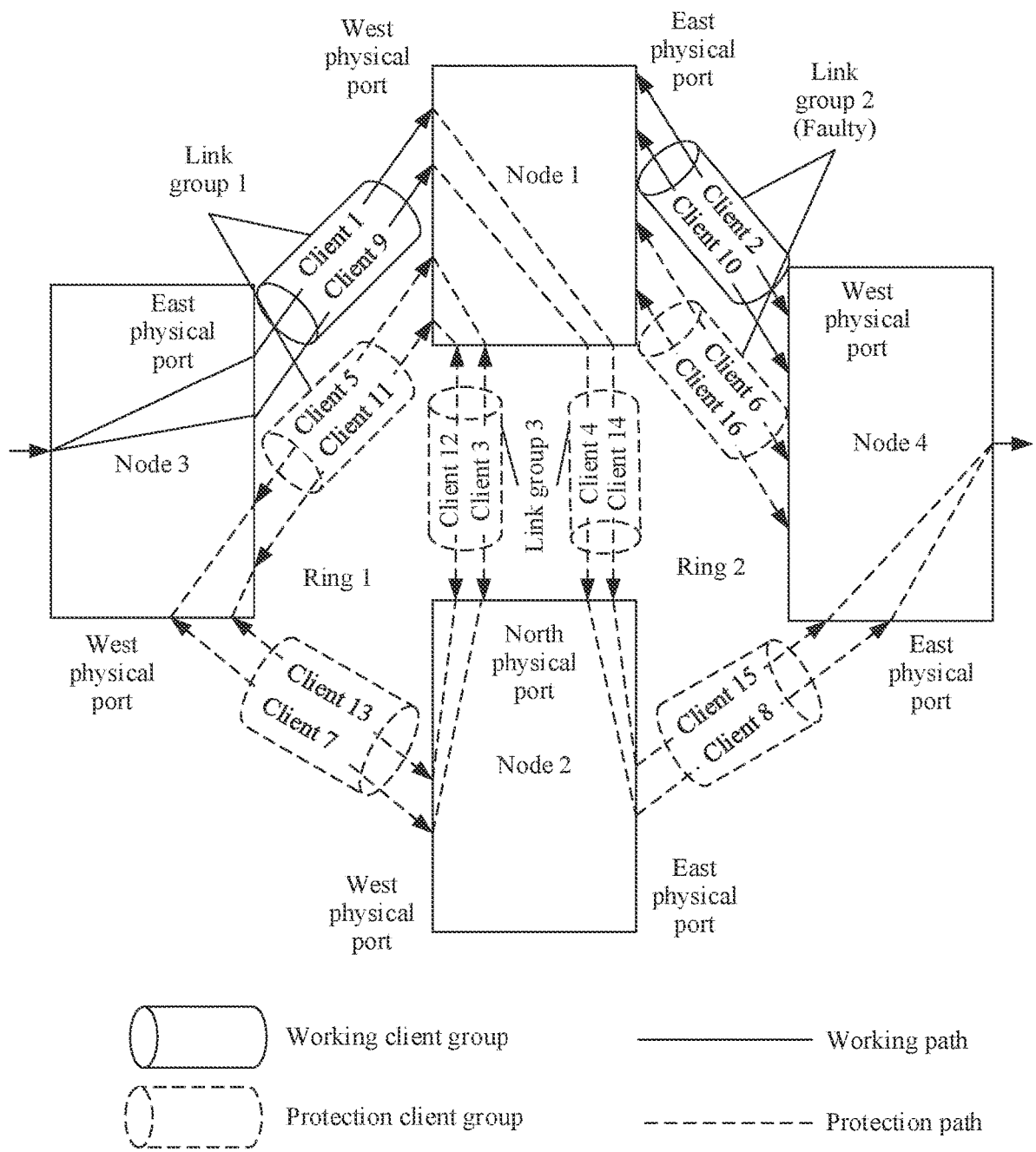
FIG. 27 is a schematic diagram of a data forwarding method of a fourth-type FlexE cross-connection ring in a second faulty state according to this application.

If a fault occurs in link group 2, node 1 may delete a FlexE cross-connection between the working client group of the west physical port and the working client group of the east physical port, establish a FlexE cross-connection between the working client group of the west physical port and the protection client group of the south physical port, and sends out service data from the protection client group of the south physical port. FIG. 27 shows the foregoing transmission path.

Figure 28:
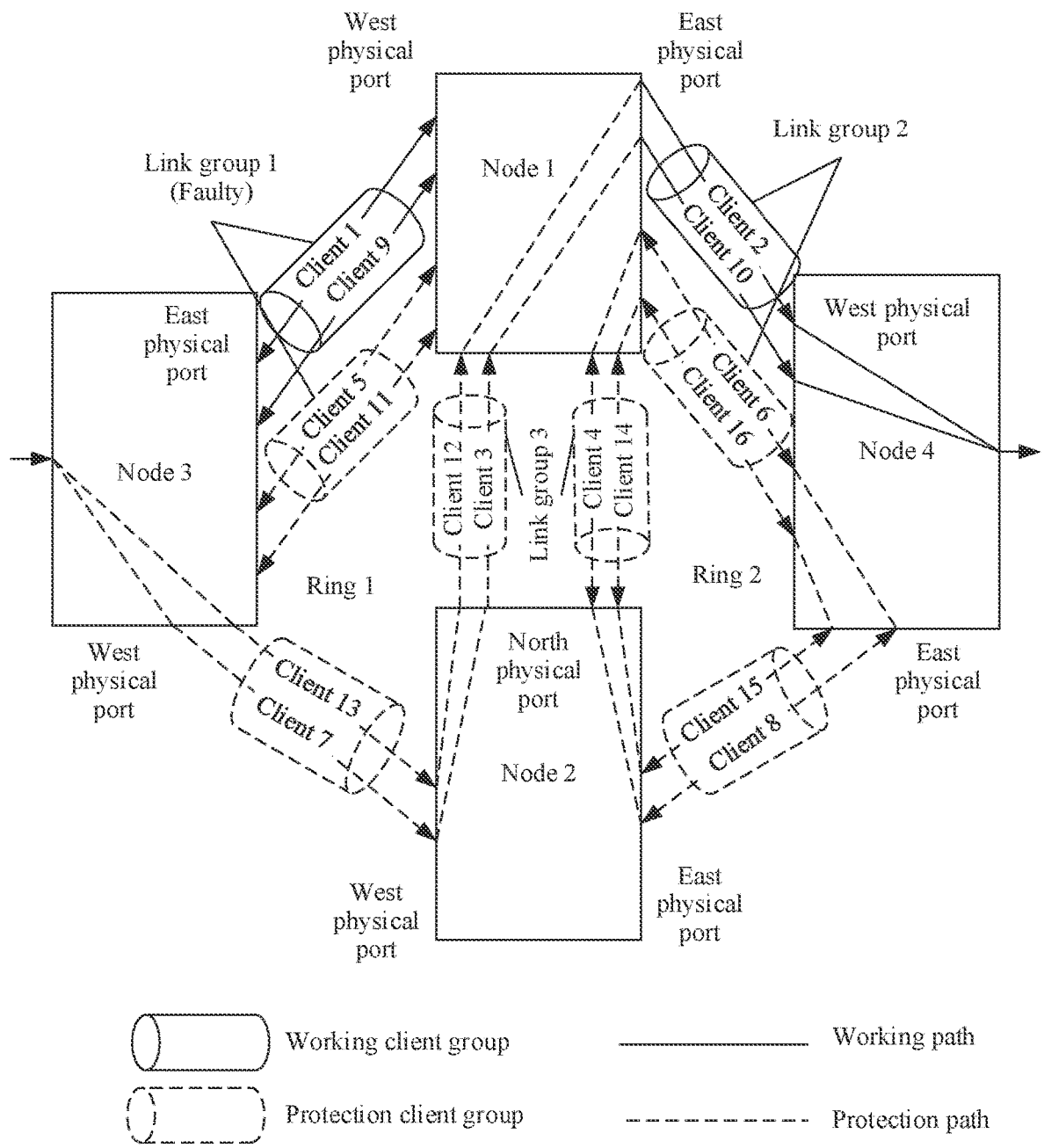
FIG. 28 is a schematic diagram of a data forwarding method of a fourth-type FlexE cross-connection ring in a third faulty state according to this application.

If a fault occurs in link group 1, node 1 may delete a FlexE cross-connection between the working client group of the west physical port and the working client group of the east physical port, establish a FlexE cross-connection between the protection client group of the south physical port and the working client group of the east physical port, and sends out service data from the working client group of the east physical port. FIG. 28 shows the foregoing transmission path.

Figure 29:
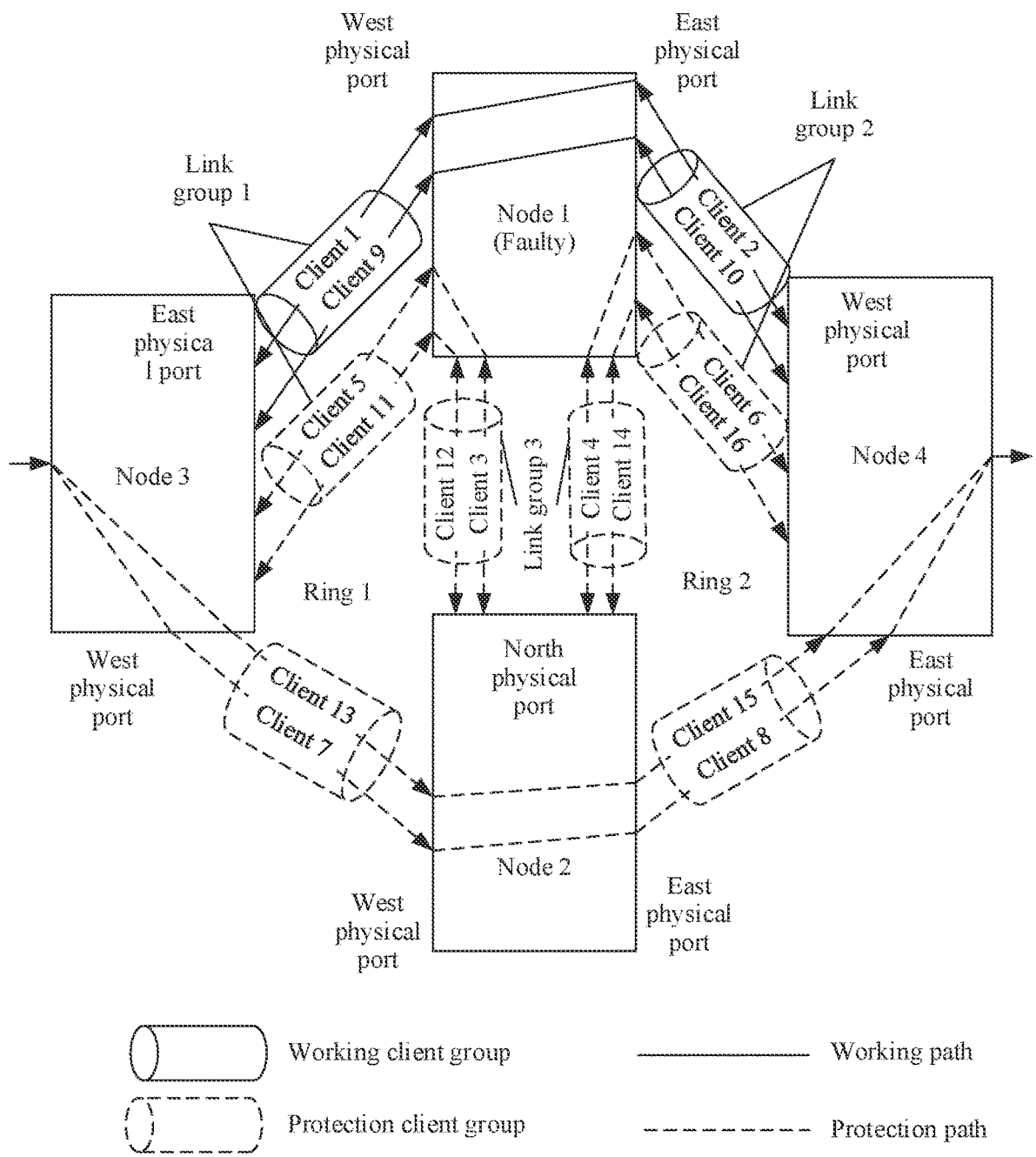
FIG. 29 is a schematic diagram of a data forwarding method of a fourth-type FlexE cross-connection ring in a fourth faulty state according to this application.

If a fault occurs in node 1, node 2 may delete a FlexE cross-connection between two protection client groups of the west physical port and a north physical port and delete a FlexE cross-connection between two protection client groups of the east physical port and the north physical port, establish a FlexE cross-connection between the protection client group of the west physical port and the protection client group of the east physical port, and sends out service data from the protection client group of the east physical port. FIG. 29 shows the foregoing transmission path.

Because a node can complete path switching by performing, based on a client group, FlexE cross-connection processing on a plurality of working clients and a plurality of protection clients once, and does not need to perform FlexE cross-connection processing on each working client and each protection client for a plurality of times, FlexE cross-connection processing based on a client group can reduce path switching overheads.

A person skilled in the art may clearly understand that it is obvious that the FlexE cross-connection rings shown in FIG. 25 to FIG. 29 and the corresponding troubleshooting methods can be applied to FIG. 4, FIG. 10, or another scenario described in this application.

This application further provides a method for detecting a fault of a FlexE cross-connection ring, and the method is applied to a FlexE cross-connection ring that includes a client group and that is shown in FIG. 25. The method includes:

Node 1 sends an OAM packet to node 3 by using working client 1, where the OAM packet is used to detect connectivity of a FlexE link group between node 1 and node 3.

If node 1 does not receive a response message of the OAM packet within N (where N is a positive integer) periods, node 1 determines that a fault occurs in the FlexE link group between node 1 and node 3, and does not need to send the OAM packet by using client 9 or client 5, thereby reducing overheads of the OAM packet. In addition, because OAM detection does not need to be configured for each client in a client group, using a FlexE cross-connection ring of the client group can reduce a workload of OAM configuration.

The foregoing solution is merely an example for description. Alternatively, node 1 may determine, based on that no OAM packet sent by node 3 is received in N periods, that a fault occurs in a FlexE link group corresponding to the west physical port.

An OAM packet may use a packet format shown in FIG. 30.

In FIG. 30, an OAM packet uses an encoding format of a 66B code block. Numbers 0 to 65 in the first row are sequence numbers of 66 bits. The first two bits are overhead bits. Starting from bit 2, eight adjacent bits are divided into one byte, and the following 64 bits are divided into 8 bytes in total.

The first byte (2-9) uses 0x4B to indicate a control type of the 66B code block, and is used to identify O code, namely, a sequence control character defined in IEEE 802.3.

In the second byte (10-17), the first two bits are a reserved field (Resv), and the last six bits are a type field (Type), indicating an OAM packet type.

When a value of the type field is 0x1, it indicates that the 66B code block is a BAS code block, and one function of the BAS code block is to detect connectivity of a path. The BAS code block is the second OAM packet described above.

When a value of the type field is 0x2, it indicates that the 66B code block is an APS code block, and one function of the APS code block is to perform detection and indicate a node to perform automatic protection switching, for example, to delete a FlexE cross-connection between working clients in two directions, and establish a FlexE cross-connection between the working client and a protection client in a same direction. The APS code block is the OAM packet described above.

The third byte (18-25), the fourth byte (26-33), the sixth byte (42-49), and the seventh byte (50-57) are value (Value) fields, which are used to carry OAM values.

In the fifth byte (34-41), the first four bits use 0xC as an identifier of an OAM information block.

In the eighth byte (58-65), the first four bits represent a sequence (Seq) field, and a value of the field may indicate different meanings represented by different code block sequences in a multi-code block packet. In a single-code block packet, the sequence field may be filled with an invalid value, for example, 0000. The last four bits of the eighth byte are a cyclic redundancy check (CRC) field used to check integrity of the foregoing eight bytes (except the CRC field).

The encoding format shown in FIG. 30 is merely an example for description. An encoding format of the OAM packet is not limited in this application. For example, the OAM packet may be encoded by using a 64B encoding format.

The foregoing describes a ring network including a multi-ring architecture (in other words, a ring network including at least two FlexE cross-connection rings) and a data forwarding method on the ring network. It should be noted that any ring network described above may further include a single-ring architecture.

Figure 31:
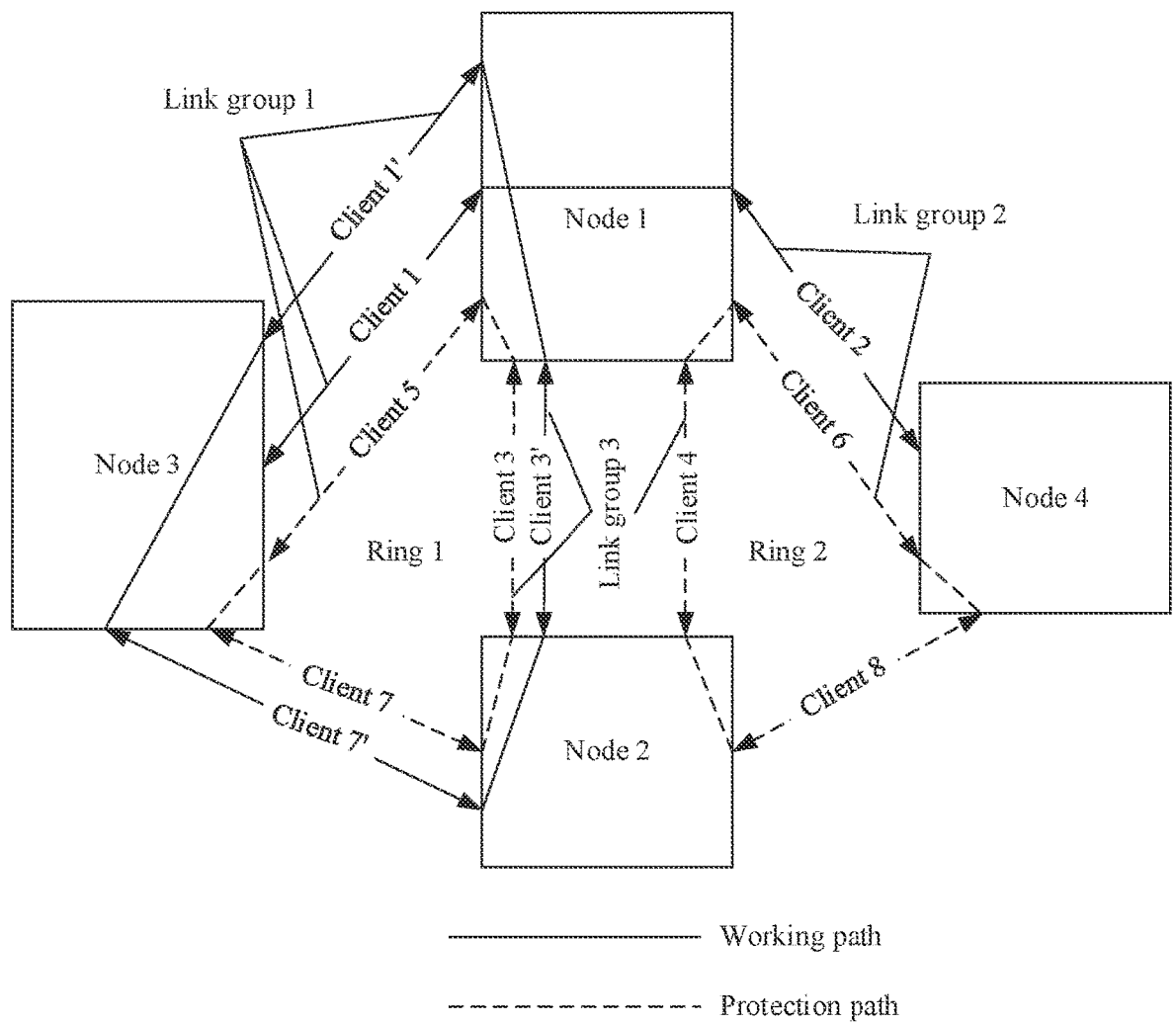
FIG. 31 is a schematic diagram of a fifth-type FlexE cross-connection ring according to this application.

FIG. 31 shows a ring network including a single-ring architecture and a multi-ring architecture.

Client 1', client 7', and client 3' form a closed working path, and client 1, client 7, and client 3 form a closed protection path. Because there is a working path and a protection path between any two of node 1, node 2, and node 3, if a fault occurs in a link between any two of the nodes, a node adjacent to a fault point may forward data by establishing a FlexE cross-connection between a working client and a protection client, in other words, forward data by using a protection path.

For example, if node 1 determines that a fault occurs in link group 3, node 1 may delete a FlexE cross-connection between client 1' and client 3', and establish a FlexE cross-connection between client 1' and client 5. Therefore, data received by using client 1' may be sent back to node 3 by using client 5, and node 3 may send the data to node 2 by using client 7, so that data forwarding in the single-ring architecture is completed.

In the solution provided in this embodiment, a protection path between nodes is established in ring 1. In this way, when a fault occurs in a transmission path (for example, link group 3) between node 1 and node 2, node 1 may establish a FlexE cross-connection between a working client (for example, client 1') and a protection client (for example, client 5) and send service data back to node 3 by using the protection client, so that a backup transmission channel is provided for the service data, thereby improving reliability of a FlexE cross-connection ring. A similar assurance mechanism may also be established in ring 2.

FIG. 31 shows an example in which a single-ring architecture and a multi-ring architecture share a same protection path (a protection path formed by client 1, client 7, and client 3). It may be understood that the single-ring architecture and the multi-ring architecture may not share a same protection path, and a ring-shaped protection path is created to provide transmission protection for a working path formed by client 1', client 7', and client 3'.

The foregoing describes in detail examples of the communication method according to this application. It may be understood that, to implement the foregoing functions, a communication apparatus includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, functional units of a data transmission apparatus may be divided based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, division into units in this application is merely an example, and is merely logical function division. During actual implementation, another division manner may be used.

Figure 32:
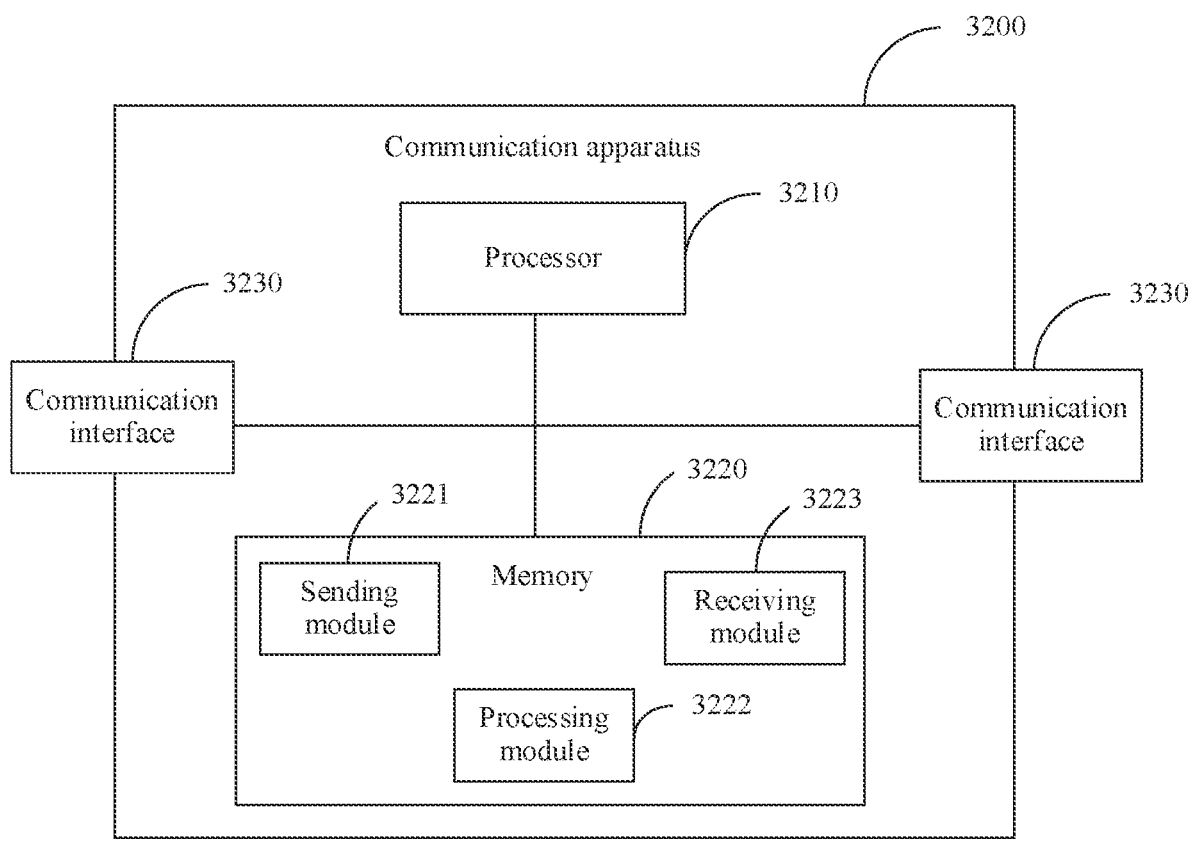
FIG. 32 is a schematic diagram of a communication apparatus according to this application.

FIG. 32 shows a schematic diagram of a communication apparatus according to this application.

The communication apparatus 3200 may be applied to the network architecture shown in FIG. 4, FIG. 10, or FIG. 25, for example, may be applied to node 1 in the network architecture shown in FIG. 4, or NE 7 in the network architecture shown in FIG. 10, or node 1 in the network architecture shown in FIG. 25. The communication apparatus 3200 may include a processor 3210, a memory 3220 coupled to the processor 3210, and a communication interface 3230. The processor 3210 may be a central processing unit (CPU), a network processor (NP), or a combination of a CPU and an NP. The processor may further include another hardware chip. The hardware chip may be an application-specific integrated circuit (aASIC), a programmable logic device (PLD), or a combination thereof. The PLD may be a complex programmable logic device (CPLD), a field-programmable gate array (FPGA), generic array logic (GAL), or a combination thereof. The processor 3210 may be one processor, or may include a plurality of processors. The memory 3220 may include a volatile memory such as a random access memory (RAM); or the memory 3220 may include a non-volatile memory such as a read-only memory (ROM), a flash, a hard disk drive (HDD), or a solid-state disk (SSD); or the memory 3220 may include a combination of the foregoing types of memories. The memory 3220 may be one memory, or may include a plurality of memories. The memory 3220 stores a computer-readable instruction. The computer readable instruction may include a plurality of software modules, for example, a sending module 3221, a processing module 3222, and a receiving module 3223. After running the foregoing software modules, the processor 3210 may perform a corresponding operation according to an instruction of each software module. In this embodiment, an operation performed by a software module actually refers to an operation performed by the processor 3210 according to an instruction of the software module. For example, after running the processing module 3222, the processor 3210 performs the following steps:

determining that a fault occurs in a first FlexE link group;

deleting a FlexE cross-connection between a third client and a fifth client; and establishing a FlexE cross-connection between the third client and a second client or a fourth client.

For example, the processor 3210 may be a processor in node 1 shown in FIG. 4, the first FlexE link group is link group 1 shown in FIG. 4, the third client is client 3, the fifth client is client 5, the second client is client 2, and the fourth client is client 4.

Because each of two adjacent FlexE cross-connection rings has a ring-shaped protection path, after a fault occurs on a working path, a common node (for example, node 1) that carries the working path may forward service data through the protection paths of the two FlexE cross-connection rings. For a FlexE cross-connection ring in the conventional technology, only a working path and an E2E protection path exist between a sending node and a receiving node. Generally, a node that carries the working path does not carry the E2E protection path. If a fault occurs in the working path carried by the common node, the working node cannot forward service data by using the protection path. Therefore, the FlexE cross-connection ring and an automatic protection switching method based on the FlexE cross-connection ring that are provided in this application improve reliability of a ring network.

After running the receiving module 3223, the processor 3210 may further perform the following step:

receiving, by using the first client, first FlexE data sent by a third network device; and after running the sending module 3221, the processor 3210 may further perform the following step:

forwarding the first FlexE data by using the second client or the fourth client.

For example, the third network device is node 3 in FIG. 4. The FlexE data is a code block that complies with a FlexE protocol. A first network device (for example, node 1 in FIG. 4) sends service data (for example, the first FlexE data) back to the third network device by using a protection client, and the third network device forwards the service data by using a protection path, thereby improving reliability of the ring network.

After the link fault in the first FlexE link group is rectified, the processor 3210 performs the following steps after running the processing module 3222:

deleting the FlexE cross-connection between the third client and the second client or the fourth client; and establishing a FlexE cross-connection between the first client and the second client or the fourth client.

The first client is, for example, client 1 in FIG. 4.

A working path is usually a preferred transmission path between network devices. After the link fault in the first FlexE link group is rectified, the first network device may choose to switch a transmission path for the service data to a working path, so that a preferred transmission resource can be provided for the service data.

After the first network device establishes the FlexE cross-connection between the first client and the second client or the fourth client, the processor 3210 may further perform the following steps after running the receiving module 3223:

receiving, by using the first client, second FlexE data sent by the third network device; and forwarding the second FlexE data by using the second client or the fourth client.

After completing path switching, the first network device forwards the second FlexE data by using the working path, so that a preferred transmission resource can be provided for the second FlexE data.

The first FlexE link group may be used to carry at least two clients, the at least two clients form one client binding group, the client binding group includes the first client, OAM detection is deployed on at least one client in the client binding group, and OAM detection is not deployed on at least one client in the client binding group. After running the processing module 3222, the processor 3210 may perform the following step:

determining, based on the OAM detection deployed on the at least one client in the client binding group, that a fault occurs in the first FlexE link group.

One working client group may be configured for a plurality of working clients between the first network device and the third network device, and one protection client group may be configured for a plurality of protection clients between the first network device and the third network device. If the first network device does not receive a response packet after sending an OAM packet to the third network device by using one client in the client group, the first network device may determine that a fault occurs in a FlexE link group (for example, the first FlexE link group) corresponding to the client group, and does not need to send an OAM packet by using each working client or protection client, thereby reducing consumption of transmission resources.

The first link group is further used to carry a seventh client and an eighth client, and a third link group is further used to carry a ninth client. After running the processing module 3222, the processor 3210 may further perform the following steps:

determining that a fault occurs in the third FlexE link group;

deleting a FlexE cross-connection between the seventh client and the ninth client; and establishing a FlexE cross-connection between the seventh client and the eighth client.

For example, the seventh client is client 1' shown in FIG. 31, the eighth client is client 5 shown in FIG. 31, and the ninth client is client 3' shown in FIG. 31.

In the solution provided in this embodiment, a protection path between network devices is established in the first FlexE cross-connection ring. In this way, when a fault occurs in a transmission path (for example, the third FlexE link group) between the first network device and the second network device, the first network device may establish a FlexE cross-connection between a working client (for example, the seventh client) and a protection client (for example, the eighth client) and send service data back to the third network device by using the protection client, so that a backup transmission channel is provided for the service data, thereby improving reliability of the first FlexE cross-connection ring. A similar assurance mechanism may also be established in the second FlexE cross-connection ring.

After the link fault in the third FlexE link group is rectified, the processor 3210 may further perform the following steps after running the processing module 3222:

deleting the FlexE cross-connection between the seventh client and the eighth client; and establishing a FlexE cross-connection between the seventh client and the ninth client.

A path corresponding to the ninth client is a working path. A working path is usually a preferred transmission path between network devices. After the link fault in the third FlexE link group is rectified, the first network device may choose to switch a transmission path for the service data to a working path, so that a preferred transmission resource can be provided for the service data.

The third FlexE link group is used to carry at least two clients, the at least two clients form one client binding group, the client binding group includes the ninth client, OAM detection is deployed on at least one client in the client binding group, and OAM detection is not deployed on at least one client in the client binding group. After running the processing module 3222, the processor 3210 may further perform the following step: determining, based on the OAM detection deployed on the at least one client in the client binding group, that the fault occurs in the third FlexE link group.

One working client group may be configured for a plurality of working clients between the first network device and the second network device, and one protection client group may be configured for a plurality of protection clients between the first network device and the second network device. If the first network device does not receive a response packet after sending an OAM packet to the second network device by using one client in the client group, the first network device may determine that a fault occurs in a FlexE link group (for example, the third FlexE link group) corresponding to the client group, and does not need to send an OAM packet by using each working client or protection client, thereby reducing consumption of transmission resources.

Figure 33:
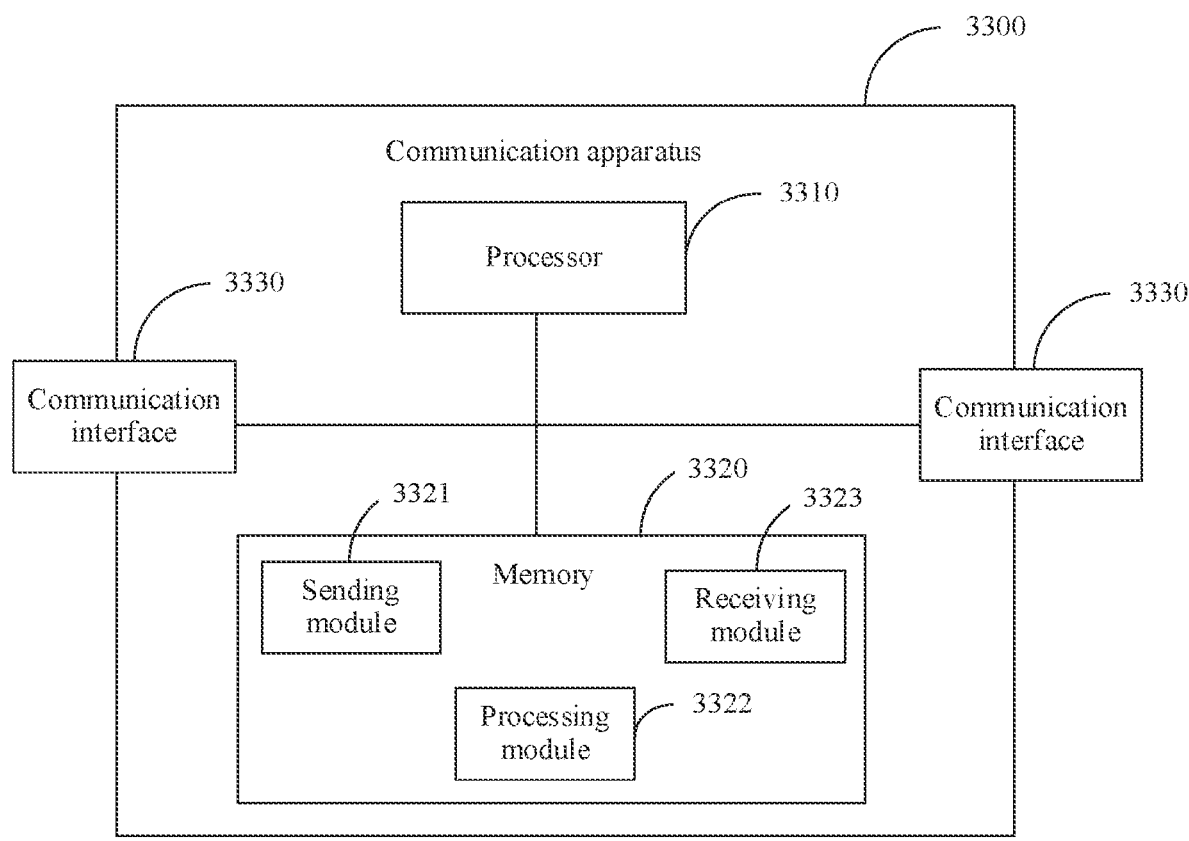
FIG. 33 is a schematic diagram of another communication apparatus according to this application.

FIG. 33 shows a schematic diagram of another communication apparatus according to this application.

The communication apparatus 3300 may be applied to the network architecture shown in FIG. 4, FIG. 10, or FIG. 25, for example, may be applied to node 2 in the network architecture shown in FIG. 4, or NE 6 in the network architecture shown in FIG. 10, or node 2 in the network architecture shown in FIG. 25. The communication apparatus 3300 may include a processor 3310, a memory 3320 coupled to the processor 3310, and a communication interface 3330. The processor 3310 may be a central processing unit (CPU), a network processor (NP), or a combination of a CPU and an NP. The processor may further include another hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or a combination thereof. The processor 3310 may be one processor, or may include a plurality of processors. The memory 3320 may include a volatile memory (volatile memory) such as a random access memory (RAM); or the memory 3320 may include a non-volatile memory such as a read-only memory (ROM), a flash, a hard disk drive (HDD), or a solid-state disk (SSD); or the memory 3320 may include a combination of the foregoing types of memories. The memory 3320 may be one memory, or may include a plurality of memories. The memory 3320 stores a computer-readable instruction. The computer readable instruction may include a plurality of software modules, for example, a sending module 3321, a processing module 3322, and a receiving module 3323. After running the foregoing software modules, the processor 3310 may perform a corresponding operation according to an instruction of each software module. In this embodiment, an operation performed by a software module actually refers to an operation performed by the processor 3310 according to an instruction of the software module. For example, after running the processing module 3322, the processor 3310 performs the following steps:

determining that a fault occurs in a first network device;
deleting a FlexE cross-connection between a third client and a seventh client;
deleting a FlexE cross-connection between a fourth client and an eighth client; and
establishing a FlexE cross-connection between the seventh client and the eighth client.

For example, the first network device is node 1 in FIG. 4, the third client is client 3 in FIG. 4, the seventh client is client 7 in FIG. 4, the fourth client is client 4 in FIG. 4, and the eighth client is client 8 in FIG. 4.

The fifth client, the third client, and the seventh client are clients on a ring-shaped protection path of a first FlexE cross-connection ring, and the fourth client, the sixth client, and the eighth client are clients on a ring-shaped protection path of a second FlexE cross-connection ring. The first network device carries a working path between the first FlexE cross-connection ring and the second FlexE cross-connection ring. When a fault occurs in a common node (for example, the first network device) of the first FlexE cross-connection ring and the second FlexE cross-connection ring, the first FlexE cross-connection ring and the second FlexE cross-connection ring need to establish an association between protection paths of two FlexE cross-connection rings by using another common node (for example, a second network device), so that data is forwarded.

Because each of the two adjacent FlexE cross-connection rings has a ring-shaped protection path, after the fault occurs in the first network device, a network device that is in the first FlexE cross-connection ring, that is adjacent to the first network device, and that carries the working path may forward service data by using the ring-shaped protection path. For a FlexE cross-connection ring in the conventional technology, only a working path and an E2E protection path exist between a sending node and a receiving node. Generally, a network device that carries the working path does not carry the E2E protection path. If a fault occurs in the first network device, a network device that is in the first FlexE cross-connection ring, that is adjacent to the first network device, and that carries the working path cannot forward service data by using the protection path. Therefore, the FlexE cross-connection ring and an automatic protection switching method based on the FlexE cross-connection ring that are provided in this application improve reliability of the ring network.

After the first network device establishes the FlexE cross-connection between the seventh client and the eighth client, the processor 3310 may further perform the following step after running the receiving module 3323:

receiving first FlexE data by using the seventh client; and
after running the sending module 3321, the processor 3310 may further perform the following step:
forwarding the first FlexE data by using the eighth client.

The FlexE data is a code block that complies with a FlexE protocol. The first network device implements data forwarding between two FlexE cross-connection rings by using protection clients of the two FlexE cross-connection rings, thereby improving reliability of the ring network.

After the link fault in the first network device is rectified, the processor 3310 may further perform the following steps after running the processing module 3322:

deleting the FlexE cross-connection between the seventh client and the eighth client; and
establishing a FlexE cross-connection between the seventh client and the third client; and
establishing a FlexE cross-connection between the eighth client and the fourth client.

After the fault in the first network device is rectified, the first network device may forward data between the two FlexE cross-connection rings by using the working path, and the processor 3310 restores a ring-shaped protection path of each of the two FlexE cross-connection rings, to continue to ensure reliability of the ring network.

Figure 34:
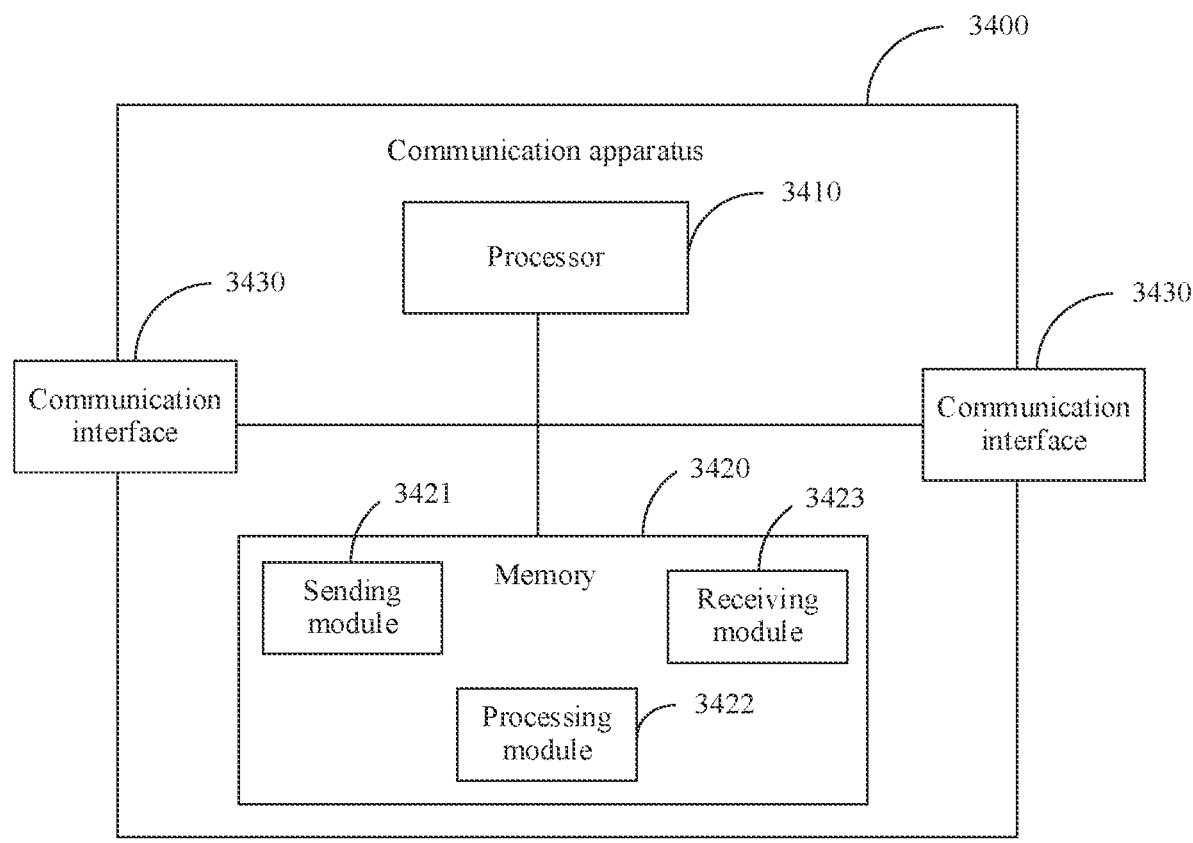
FIG. 34 is a schematic diagram of still another communication apparatus according to this application.

FIG. 34 shows a schematic diagram of still another communication apparatus according to this application.

Figure 17:
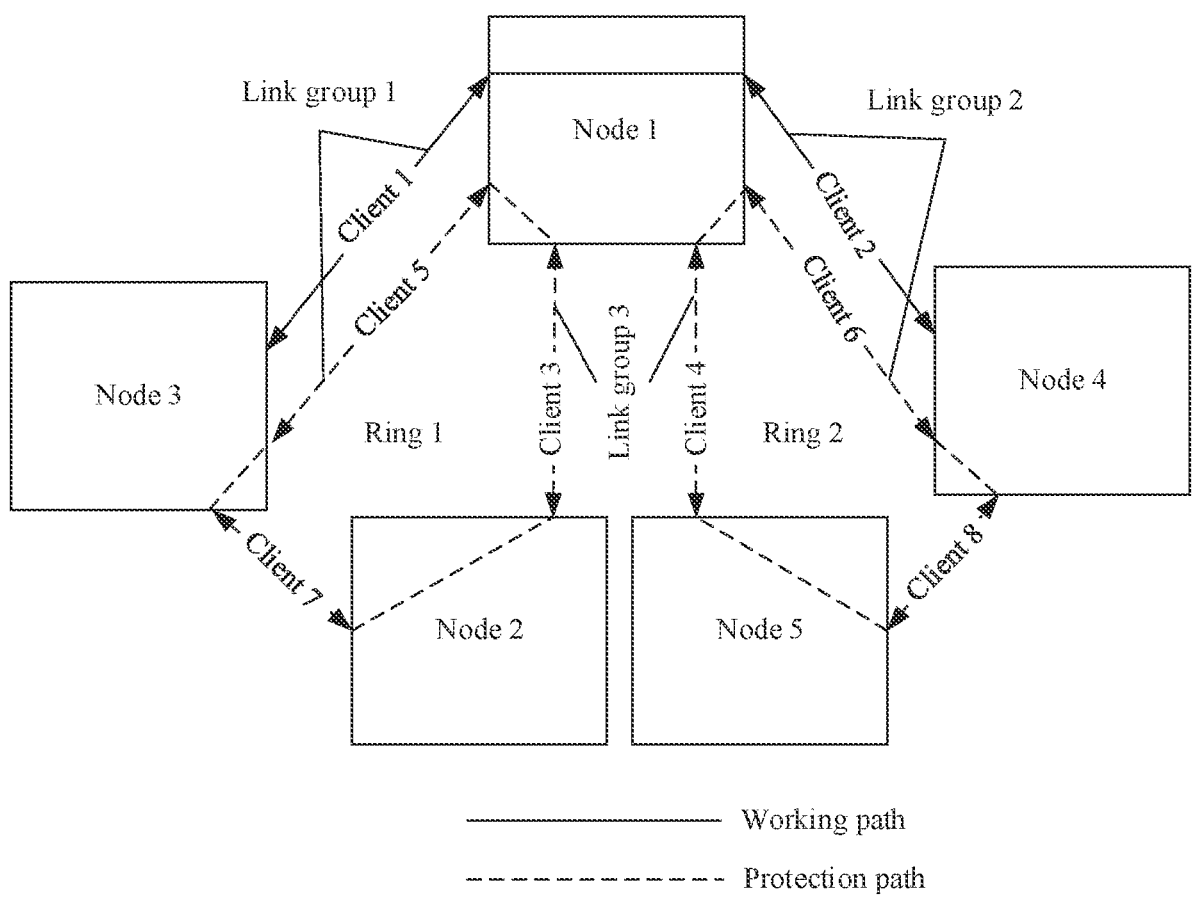
FIG. 17 shows a schematic diagram of a third-type FlexE cross-connection ring according to this application.

The communication apparatus 3400 may be applied to the network architecture shown in FIG. 17, for example, may be applied to node 1 in the network architecture shown in FIG. 17. The communication apparatus 3400 may include a processor 3410, a memory 3420 coupled to the processor 3410, and a communication interface 3430. The processor 3410 may be a central processing unit (CPU), a network processor (NP), or a combination of a CPU and an NP. The processor may further include another hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or a combination thereof. The processor 3410 may be one processor, or may include a plurality of processors. The memory 3420 may include a volatile memory) such as a random access memory (RAM); or the memory 3420 may include a non-volatile memory such as a read-only memory (ROM), a flash, a hard disk drive (HDD), or a solid-state disk (SSD); or the memory 3420 may include a combination of the foregoing types of memories. The memory 3420 may be one memory, or may include a plurality of memories. The memory 3420 stores a computer-readable instruction. The computer readable instruction may include a plurality of software modules, for example, a sending module 3421, a processing module 3422, and a receiving module 3423. After running the foregoing software modules, the processor 3410 may perform a corresponding operation according to an instruction of each software module. In this embodiment, an operation performed by a software module actually refers to an operation performed by the processor 3410 according to an instruction of the software module. For example, after running the processing module 3422, the processor 3410 performs the following steps:

determining that a fault occurs in a first FlexE link group;
    deleting a FlexE cross-connection between a third client and a fifth client; and
    establishing a FlexE cross-connection between the third client and a second client or a fourth client.

For example, the processor 3410 may be a processor in node 1 shown in FIG. 17, the first FlexE link group is link group 1 shown in FIG. 4, the third client is client 3, the fifth client is client 5, the second client is client 2, and the fourth client is client 4.

Because each of two adjacent FlexE cross-connection rings has a ring-shaped protection path, after a fault occurs on a working path, a common node (for example, node 1) that carries the working path may forward service data through the protection paths of the two FlexE cross-connection rings. For a FlexE cross-connection ring in the conventional technology, only a working path and an E2E protection path exist between a sending node and a receiving node. Generally, a node that carries the working path does not carry the E2E protection path. If a fault occurs in the working path carried by the common node, the working node cannot forward service data by using the protection path. Therefore, the FlexE cross-connection ring and an automatic protection switching method based on the FlexE cross-connection ring that are provided in this application improve reliability of a ring network.

After running the receiving module 3423, the processor 3410 may further perform the following step:
    receiving, by using the first client, first FlexE data sent by a third network device; and
    after running the sending module 3421, the processor 3210 may further perform the following step:
    forwarding the first FlexE data by using the second client or the fourth client.

For example, the third network device is node 3 in FIG. 17. The FlexE data is a code block that complies with a FlexE protocol. A first network device (for example, node 1 in FIG. 17) sends service data (for example, the first FlexE data) back to the third network device by using a protection client, and the third network device forwards the service data by using a protection path, thereby improving reliability of the ring network.

After the link fault in the first FlexE link group is rectified, the processor 3410 performs the following steps after running the processing module 3422:
    deleting the FlexE cross-connection between the third client and the second client or the fourth client; and
    establishing a FlexE cross-connection between the first client and the second client or the fourth client.

The first client is, for example, client 1 in FIG. 17.

A working path is usually a preferred transmission path between network devices. After the link fault in the first FlexE link group is rectified, the first network device may choose to switch a transmission path for the service data to a working path, so that a preferred transmission resource can be provided for the service data.

After the first network device establishes the FlexE cross-connection between the first client and the second client or the fourth client, the processor 3410 may further perform the following steps after running the receiving module 3423:
    receiving, by using the first client, second FlexE data sent by the third network device; and
    forwarding the second FlexE data by using the second client or the fourth client.

After completing path switching, the first network device forwards the second FlexE data by using the working path, so that a preferred transmission resource can be provided for the second FlexE data.

The first FlexE link group may be used to carry at least two clients, the at least two clients form one client binding group, the client binding group includes the first client, OAM detection is deployed on at least one client in the client binding group, and OAM detection is not deployed on at least one client in the client binding group. After running the processing module 3422, the processor 3410 may perform the following step:
    determining, based on the OAM detection deployed on the at least one client in the client binding group, that a fault occurs in the first FlexE link group.

One working client group may be configured for a plurality of working clients between the first network device and the third network device, and one protection client group may be configured for a plurality of protection clients between the first network device and the third network device. If the first network device does not receive a response packet after sending an OAM packet to the third network device by using one client in the client group, the first network device may determine that a fault occurs in a FlexE link group (for example, the first FlexE link group) corresponding to the client group, and does not need to send an OAM packet by using each working client or protection client, thereby reducing consumption of transmission resources.

The first link group is further used to carry a seventh client and an eighth client, and a third link group is further used to carry a ninth client. After running the processing module 3422, the processor 3410 may further perform the following steps:
    determining that a fault occurs the third FlexE link group;
    deleting a FlexE cross-connection between the seventh client and the ninth client; and
    establishing a FlexE cross-connection between the seventh client and the eighth client.

For example, the seventh client is client 1' shown in FIG. 31, the eighth client is client 5 shown in FIG. 31, and the ninth client is client 3' shown in FIG. 31.

In the solution provided in this embodiment, a protection path between network devices is established in the first FlexE cross-connection ring. In this way, when a fault occurs in a transmission path (for example, the third FlexE link group) between the first network device and the second network device, the first network device may establish a FlexE cross-connection between a working client (for example, the seventh client) and a protection client (for example, the eighth client) and send service data back to the third network device by using the protection client, so that a backup transmission channel is provided for the service data, thereby improving reliability of the first FlexE cross-connection ring. A similar assurance mechanism may also be established in the second FlexE cross-connection ring.

After the link fault in the third FlexE link group is rectified, the processor 3410 may further perform the following steps after running the processing module 3422:
  deleting the FlexE cross-connection between the seventh client and the eighth client; and
  establishing a FlexE cross-connection between the seventh client and the ninth client.

A path corresponding to the ninth client is a working path. A working path is usually a preferred transmission path between network devices. After the link fault in the third FlexE link group is rectified, the first network device may choose to switch the transmission path for the service data to a working path, so that a preferred transmission resource can be provided for the service data.

The third FlexE link group is used to carry at least two clients, the at least two clients form one client binding group, the client binding group includes the ninth client, OAM detection is deployed on at least one client in the client binding group, and OAM detection is not deployed on at least one client in the client binding group. After running the processing module 3422, the processor 3410 may further perform the following step: determining, based on the OAM detection deployed on the at least one client, that the fault occurs in the third FlexE link group.

One working client group may be configured for a plurality of working clients between the first network device and the second network device, and one protection client group may be configured for a plurality of protection clients between the first network device and the second network device. If the first network device does not receive a response packet after sending an OAM packet to the second network device by using one client in the client group, the first network device may determine that a fault occurs in a FlexE link group (for example, the third FlexE link group) corresponding to the client group, and does not need to send an OAM packet by using each working client or protection client, thereby reducing consumption of transmission resources.

The apparatus embodiments correspond to the method embodiments. Steps in the method embodiments are performed by corresponding modules in the apparatus embodiments. For example, the communication interface performs the step of receiving and the step of sending in the method embodiments, and other steps than the step of receiving and the step of sending may be performed by the processor. For a function of a specific module, refer to the corresponding method embodiment. Details are not described again.

It should be understood that sequence numbers of the foregoing processes do not mean execution sequences in various embodiments of this application. The execution sequences of the processes should be determined based on functions and internal logic of the processes, and should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, applied to a ring network, wherein the ring network comprises a first flexible Ethernet (FlexE) cross-connection ring and a second FlexE cross-connection ring, the first FlexE cross-connection ring comprises a first network device, a second network device, and a third network device, and the second FlexE cross-connection ring comprises a fourth network device, the first network device, and the second network device, wherein the first network device is adjacent to the second network device, the first network device is adjacent to the third network device, and the first network device is adjacent to the fourth network device; the first network device and the second network device are intersection nodes of the first FlexE cross-connection ring and the second FlexE cross-connection ring; there is a first FlexE link group between the first network device and the third network device, there is a second FlexE link group between the first network device and the fourth network device, there is a third FlexE link group between the first network device and the second network device, the first FlexE link group is used to carry a first client and a fifth client; the second FlexE link group is used to carry a second client and a sixth client, the third FlexE link group is used to carry a third client and a fourth client, the third client is used to transmit data within the first FlexE cross-connection ring, and the fourth client is used to transmit data within the second FlexE cross-connection ring, and wherein each client represents a client service implemented as an Ethernet flow; and
  the method comprises:
    determining, by the first network device, that a fault occurs in the first FlexE link group;
    deleting, by the first network device, a FlexE cross-connection between the third client and the fifth client; and
    establishing, by the first network device, a FlexE cross-connection between the third client and the second client or the fourth client;
    wherein each FlexE cross-connection between two clients represents a timeslot cross-connection between timeslots allocated to the two clients.

2. The method according to claim 1, wherein after the link fault in the first FlexE link group is rectified, the method further comprises:
  deleting, by the first network device, the FlexE cross-connection between the third client and the second client or the fourth client; and
  establishing, by the first network device, a FlexE cross-connection between the first client and the second client or the fourth client.

3. The method according to claim 1, wherein the first FlexE link group is used to carry at least two clients, the at least two clients form one client binding group, the client binding group comprises the first client, operation, administration and maintenance (OAM) detection is deployed on at least one client in the client binding group, and OAM detection is not deployed on at least one client in the client binding group; and the determining, by the first network device, that a fault occurs in the first FlexE link group comprises:
determining, by the first network device based on the OAM detection, that the fault occurs in the first FlexE link group.

4. The method according to claim 1, wherein the first link group is further used to carry a seventh client and an eighth client, the third link group is further used to carry a ninth client, and the method further comprises:
determining, by the first network device, that a fault occurs in the third FlexE link group;
deleting, by the first network device, a FlexE cross-connection between the seventh client and the ninth client; and
establishing, by the first network device, a FlexE cross-connection between the seventh client and the eighth client.

5. The method according to claim 4, wherein after the link fault in the third FlexE link group is rectified, the method further comprises:
deleting, by the first network device, the FlexE cross-connection between the seventh client and the eighth client; and
establishing, by the first network device, a FlexE cross-connection between the seventh client and the ninth client.

6. The method according to claim 4, wherein the third FlexE link group is used to carry at least two clients, the at least two clients form one client binding group, the client binding group comprises the ninth client, OAM detection is deployed on at least one client in the client binding group, and OAM detection is not deployed on at least one client in the client binding group; and
the determining, by the first network device, that a fault occurs in the third FlexE link group comprises:
determining, by the first network device based on the OAM detection, that the fault occurs in the third FlexE link group.

7. A computer hardware chip, applied to a first network device in a ring network, wherein the ring network comprises a first flexible Ethernet (FlexE) cross-connection ring and a second FlexE cross-connection ring, the first FlexE cross-connection ring comprises the first network device, a second network device, and a third network device, and the second FlexE cross-connection ring comprises a fourth network device, the first network device, and the second network device, wherein the first network device is adjacent to the second network device, the first network device is adjacent to the third network device, and the first network device is adjacent to the fourth network device; the first network device and the second network device are intersection nodes of the first FlexE cross-connection ring and the second FlexE cross-connection ring; there is a first FlexE link group between the first network device and the third network device, there is a second FlexE link group between the first network device and the fourth network device, there is a third FlexE link group between the first network device and the second network device, the first FlexE link group is used to carry a first client and a fifth client; the second FlexE link group is used to carry a second client and a sixth client, the third FlexE link group is used to carry a third client and a fourth client, the third client is used to transmit data within the first FlexE cross-connection ring, and the fourth client is used to transmit data within the second FlexE cross-connection ring, and wherein each client is a client service implemented as an Ethernet flow; and the chip comprises:
a processor circuit, configured to:
determine that a fault occurs in the first FlexE link group;
delete a FlexE cross-connection between the third client and the fifth client; and
establish a FlexE cross-connection between the third client and the second client or the fourth client;
wherein each FlexE cross-connection between two clients represents a timeslot cross-connection between timeslots allocated to the two clients.

8. The chip according to claim 7, wherein after the link fault in the first FlexE link group is rectified, the processor circuit is further configured to:
delete the FlexE cross-connection between the third client and the second client or the fourth client; and
establish a FlexE cross-connection between the first client and the second client or the fourth client.

9. The chip according to claim 7, wherein the first FlexE link group is used to carry at least two clients, the at least two clients form one client binding group, the client binding group comprises the first client, operation, administration and maintenance (OAM) detection is deployed on at least one client in the client binding group, and OAM detection is not deployed on at least one client in the client binding group; and
the processor circuit is further configured to:
determine, based on the OAM detection, that the fault occurs in the first FlexE link group.

10. The chip according to claim 7, wherein the first link group is further used to carry a seventh client and an eighth client, the third link group is further used to carry a ninth client, and the processor circuit is further configured to:
determine that a fault occurs in the third FlexE link group;
delete a FlexE cross-connection between the seventh client and the ninth client; and
establish a FlexE cross-connection between the seventh client and the eighth client.

11. The chip according to claim 10, wherein after the link fault in the third FlexE link group is rectified, the processor circuit is further configured to:
delete the FlexE cross-connection between the seventh client and the eighth client; and
establish a FlexE cross-connection between the seventh client and the ninth client.

12. The chip according to claim 10, wherein the third FlexE link group is used to carry at least two clients, the at least two clients form one client binding group, the client binding group comprises the ninth client, OAM detection is deployed on at least one client in the client binding group, and OAM detection is not deployed on at least one client in the client binding group; and
the processor circuit is further configured to:
determine, based on the OAM detection, that the fault occurs in the third FlexE link group.

13. A first network device, wherein applied to a ring network, wherein the ring network comprises a first flexible Ethernet (FlexE) cross-connection ring and a second FlexE cross-connection ring, the first FlexE cross-connection ring comprises the first network device, a second network device, and a third network device, and the second FlexE cross-connection ring comprises a fourth network device, the first network device, and the second network device, wherein the first network device is adjacent to the second network device, the first network device is adjacent to the third network device, and the first network device is adjacent to the fourth network device; the first network device and the second network device are intersection nodes of the first FlexE cross-connection ring and the second FlexE cross-connection ring; there is a first FlexE link group between the first network device and the third network device, there is a second FlexE link group between the first network device and the fourth network device, there is a third FlexE link group between the first network device and the second network device, the first FlexE link group is used to carry a first client and a fifth client; the second FlexE link group is used to carry a second client and a sixth client, the third FlexE link group is used to carry a third client and a fourth client, the third client is used to transmit data within the first FlexE cross-connection ring, and the fourth client is used to transmit data within the second FlexE cross-connection ring, and wherein each client is a client service implemented as an Ethernet flow; and the first network device comprises:
a memory, wherein the memory comprises a computer-readable instruction; and
a processor connected to the memory, wherein when the instructions executed by the processor, cause the first network device to:
determine that a fault occurs in the first FlexE link group;
delete a FlexE cross-connection between the third client and the fifth client; and
establish a FlexE cross-connection between the third client and the second client or the fourth client;
wherein each FlexE cross-connection between two clients represents a timeslot cross-connection between timeslots allocated to the two clients.

14. The first network device according to claim 13, wherein after the link fault in the first FlexE link group is rectified, the instructions further cause the first network device to:
delete the FlexE cross-connection between the third client and the second client or the fourth client; and
establish a FlexE cross-connection between the first client and the second client or the fourth client.

15. The first network device according to claim 13, wherein the first FlexE link group is used to carry at least two clients, the at least two clients form one client binding group, the client binding group comprises the first client, operation, administration and maintenance (OAM) detection is deployed on at least one client in the client binding group, and OAM detection is not deployed on at least one client in the client binding group; and
the instructions further cause the first network device to:
determine, based on the OAM detection, that the fault occurs in the first FlexE link group.

16. The first network device according to claim 13, wherein the first link group is further used to carry a seventh client and an eighth client, the third link group is further used to carry a ninth client, and the instructions further cause the first network device to:
determine that a fault occurs in the third FlexE link group;
delete a FlexE cross-connection between the seventh client and the ninth client; and
establish a FlexE cross-connection between the seventh client and the eighth client.

17. The first network device according to claim 16, wherein after the link fault in the third FlexE link group is rectified, the instructions further cause the first network device to:
delete the FlexE cross-connection between the seventh client and the eighth client; and
establish a FlexE cross-connection between the seventh client and the ninth client.

18. The first network device according to claim 16, wherein the third FlexE link group is used to carry at least two clients, the at least two clients form one client binding group, the client binding group comprises the ninth client, OAM detection is deployed on at least one client in the client binding group, and OAM detection is not deployed on at least one client in the client binding group; and
the instructions further cause the first network device to:
determine, based on the OAM detection, that the fault occurs in the third FlexE link group.

* * * * *